United States Patent
Wyville et al.

(10) Patent No.: US 9,960,805 B2
(45) Date of Patent: *May 1, 2018

(54) DIGITAL SUPPRESSION OF TRANSMITTER INTERMODULATION IN RECEIVER

(71) Applicant: Telefonaktiebolaget LM Ericsson (publ), Stockholm (SE)

(72) Inventors: Mark Wyville, Ottawa (CA); Lars Johan Thorebäck, Sundbyberg (SE); Spendim Dalipi, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/191,793

(22) Filed: Jun. 24, 2016

(65) Prior Publication Data

US 2016/0308562 A1 Oct. 20, 2016

Related U.S. Application Data

(63) Continuation of application No. 14/728,095, filed on Jun. 2, 2015, now Pat. No. 9,509,365, which is a
(Continued)

(51) Int. Cl.
*H04B 1/38* (2015.01)
*H04B 1/62* (2006.01)
(Continued)

(52) U.S. Cl.
CPC .............. *H04B 1/62* (2013.01); *H04B 1/1018* (2013.01); *H04B 1/525* (2013.01); *H04L 43/028* (2013.01)

(58) Field of Classification Search
CPC ........ H04B 1/1018; H04B 1/525; H04B 1/62; H04L 43/028
(Continued)

(56) References Cited

U.S. PATENT DOCUMENTS 5,386,198 A 1/1995 Ripstrand et al.
5,444,864 A 8/1995 Smith
(Continued)

FOREIGN PATENT DOCUMENTS

CN 1859598 A 11/2006
CN 101373998 A 2/2009
(Continued)

OTHER PUBLICATIONS

Choi, Heungjae, et al., "Digital Controlled Co-channel Feedback Interference Cancellation System with Broadband Cancellation," Proceedings of the 1st European Wireless Technology Conference, Amsterdam, The Netherlands, Oct. 27, 2008, pp. 194-197.
(Continued)

*Primary Examiner* — Marceau Milord
(74) *Attorney, Agent, or Firm* — Withrow & Terranova, PLLC

(57) ABSTRACT

Systems and methods for suppressing transmitter noise in a receive band of a co-located receiver that are suitable for wideband applications are disclosed. In one embodiment, a transmitter is configured to upconvert and amplify a digital transmit signal to provide an analog radio frequency transmit signal at an output of the transmitter that includes a desired signal in a transmit band of the transmitter and transmitter noise in a receive band of a main receiver. The main receiver is configured to amplify, downconvert, and digitize an analog radio frequency receive signal to provide a digital receive signal. The digital feedforward transmit noise cancellation subsystem is configured to process the digital transmit signal to generate a digital transmitter noise cancellation signal that is representative of the transmitter noise in the receive band and is subtracted from the digital receive signal to thereby provide a compensated digital receive signal.

13 Claims, 17 Drawing Sheets

Related U.S. Application Data continuation of application No. 13/932,307, filed on Jul. 1, 2013, now Pat. No. 9,077,440, which is a continuation-in-part of application No. 13/734,250, filed on Jan. 4, 2013, now Pat. No. 8,995,932.

(51) Int. Cl.
  *H04B 1/525* (2015.01)
  *H04B 1/10* (2006.01)
  *H04L 12/26* (2006.01)

(58) Field of Classification Search
  USPC ........ 455/73, 83, 114.2, 118, 126, 114.3, 24, 455/304, 280
  See application file for complete search history.

(56) References Cited

U.S. PATENT DOCUMENTS

| | | | |
|---|---|---|---|
| 5,455,537 A | 10/1995 | Larkin et al. | |
| 5,479,168 A * | 12/1995 | Johnson | G06J 1/00 341/110 |
| 5,994,957 A | 11/1999 | Myer | |
| 6,081,549 A | 6/2000 | Shou et al. | |
| 6,091,296 A | 7/2000 | Rha | |
| 6,144,255 A * | 11/2000 | Patel | H03F 1/3229 330/149 |
| 6,188,732 B1 * | 2/2001 | Rha | H03F 1/3229 330/149 |
| 6,525,603 B1 * | 2/2003 | Morgan | H03F 1/3235 330/151 |
| 6,556,076 B1 | 4/2003 | Posner | |
| 6,680,649 B2 * | 1/2004 | Rydin | H03F 1/3229 330/149 |
| 6,683,495 B2 | 1/2004 | Johnson et al. | |
| 6,965,578 B1 * | 11/2005 | Kappes | H04B 3/23 370/286 |
| 6,999,523 B2 * | 2/2006 | Posti | H03F 1/3247 375/296 |
| 7,058,368 B2 * | 6/2006 | Nicholls | H04B 1/525 375/296 |
| 7,075,468 B1 * | 7/2006 | Pellon | H03M 3/37 341/143 |
| 7,595,689 B1 | 9/2009 | Kenington | |
| 7,636,554 B2 * | 12/2009 | Sugar | H04B 1/005 455/272 |
| 7,642,850 B2 * | 1/2010 | Martin | H03F 1/3229 330/151 |
| 7,702,295 B1 | 4/2010 | Nicholls et al. | |
| 7,706,755 B2 * | 4/2010 | Muhammad | H03C 5/00 455/106 |
| 7,711,329 B2 * | 5/2010 | Aparin | H04B 1/525 455/24 |
| 7,773,967 B2 * | 8/2010 | Smith | H04B 1/30 455/114.1 |
| 7,792,432 B2 * | 9/2010 | Iannelli | H04B 10/5051 398/182 |
| 7,881,621 B2 * | 2/2011 | Iannelli | H04B 10/505 398/182 |
| 7,899,142 B2 * | 3/2011 | Hayashi | G01S 7/038 370/276 |
| 8,098,779 B2 | 1/2012 | Komninakis et al. | |
| 8,170,487 B2 | 5/2012 | Sahota et al. | |
| 8,218,677 B2 | 7/2012 | Jin et al. | |
| 8,238,849 B2 * | 8/2012 | Pratt | H03F 1/3247 330/149 |
| 8,249,540 B1 * | 8/2012 | Gupta | H04B 1/109 455/295 |
| 8,260,143 B2 | 9/2012 | Gupta et al. | |
| 8,306,480 B2 * | 11/2012 | Muhammad | H04B 1/525 455/296 |
| 8,320,866 B2 | 11/2012 | Pratt et al. | |
| 8,320,868 B2 | 11/2012 | Pratt et al. | |
| 8,379,699 B2 | 2/2013 | Smiley | |
| 8,385,871 B2 | 2/2013 | Wyville | |
| 8,755,758 B2 | 6/2014 | Andersson et al. | |
| 8,767,869 B2 | 7/2014 | Rimini et al. | |
| 8,804,871 B2 | 8/2014 | Rimini et al. | |
| 8,855,175 B2 | 10/2014 | Wyville et al. | |
| 8,867,477 B2 | 10/2014 | Song et al. | |
| 8,880,010 B2 | 11/2014 | Ballantyne | |
| 8,917,792 B2 | 12/2014 | Black et al. | |
| 8,995,932 B2 * | 3/2015 | Wyville | H04B 1/525 330/149 |
| 9,077,440 B2 * | 7/2015 | Wyville | H04B 1/525 |
| 9,312,895 B1 * | 4/2016 | Gupta | H04B 1/109 |
| 9,362,967 B2 * | 6/2016 | Wyville | H04B 1/525 |
| 9,420,566 B2 | 8/2016 | Golitschek Edler von Elbwart et al. | |
| 2002/0048326 A1 * | 4/2002 | Sahlman | H03F 1/3229 375/297 |
| 2004/0203458 A1 | 10/2004 | Nigra | |
| 2004/0251961 A1 | 12/2004 | Braithwaite | |
| 2005/0200422 A1 * | 9/2005 | Shamsaifar | H03H 7/12 333/17.1 |
| 2007/0280172 A1 | 12/2007 | Tan et al. | |
| 2008/0039045 A1 | 2/2008 | Filipovic et al. | |
| 2009/0086863 A1 * | 4/2009 | Komninakis | H04B 1/10 375/346 |
| 2010/0220810 A1 | 9/2010 | Jin et al. | |
| 2011/0170473 A1 | 7/2011 | Proctor, Jr. et al. | |
| 2011/0235553 A1 * | 9/2011 | Andersson | H04B 1/0475 370/277 |
| 2012/0140860 A1 | 6/2012 | Rimini et al. | |
| 2012/0170624 A1 * | 7/2012 | Rozenblit | H03G 3/3042 375/219 |
| 2012/0230368 A1 | 9/2012 | Smiley | |
| 2012/0231739 A1 | 9/2012 | Chen et al. | |
| 2013/0102254 A1 * | 4/2013 | Cyzs | H04B 1/126 455/63.1 |
| 2013/0201050 A1 * | 8/2013 | Hellsten | G01S 7/006 342/21 |
| 2014/0161159 A1 | 6/2014 | Black et al. | |
| 2014/0194071 A1 | 7/2014 | Wyville | |
| 2014/0194073 A1 | 7/2014 | Wyville et al. | |
| 2015/0180522 A1 | 6/2015 | Wyville | |
| 2016/0234005 A1 * | 8/2016 | Hong | H04B 15/00 |

FOREIGN PATENT DOCUMENTS

| | | |
|---|---|---|
| CN | 102113258 A | 6/2011 |
| CN | 102170334 A | 8/2011 |
| GB | 2273622 A | 6/1994 |
| WO | 2007117189 A1 | 10/2007 |
| WO | 2009156510 A2 | 12/2009 |

OTHER PUBLICATIONS

Kannangara, Shyama, et al., "Adaptive Duplexer for Multiband Transreceiver," Radio and Wireless Conference (RAWCON '03) Proceedings, Boston, Massachusetts, Aug. 10-13, 2003, IEEE, pp. 381-384.

O'Sullivan, Tomás, et al., "Adaptive Duplexer Implemented Using Single-Path and Multipath Feedforward Techniques With BST Phase Shifters," IEEE Transactions on Microwave Theory and Techniques, vol. 53. Issue 1, Jan. 2005, pp. 106-114.

Roussel, Alain, et al., "Frequency Agile Bandstop Filter (FABSF)," Microwave Symposium Digest, Atlanta, Georgia, Jun. 15-20, 2008, pp. 1099-1102.

Extended European Search Report for European Patent Application No. 13005945.4, dated Mar. 31, 2014, 7 pages.

Extended European Search Report for European Patent Application No. 14002211.2, dated Nov. 6, 2014, 8 pages.

Notice of Allowance for U.S. Appl. No. 13/046,107, dated Oct. 11, 2012, 9 pages.

Notice of Allowance for U.S. Appl. No. 13/734,250, dated Nov. 21, 2014, 7 pages.

Non-Final Office Action for U.S. Appl. No. 13/932,307, dated Nov. 26, 2014, 5 pages.

(56) References Cited

OTHER PUBLICATIONS

Notice of Allowance for U.S. Appl. No. 13/932,307, dated Mar. 2, 2015, 7 pages.
Non-Final Office Action for U.S. Appl. No. 14/636,854, dated Oct. 7, 2015, 10 pages.
Notice of Allowance for U.S. Appl. No. 14/636,854, dated Feb. 19, 2016, 7 pages.
Non-Final Office Action for U.S. Appl. No. 14/728,095, dated Dec. 17, 2015, 10 pages.
Notice of Allowance for U.S. Appl. No. 14/728,095, dated May 6, 2016, 7 pages.
Notice of Allowance for U.S. Appl. No. 14/728,095, dated Jul. 27, 2016, 5 pages.
First Office Action and Search Report for Chinese Patent Application No. 201480007587.7, dated Jun. 14, 2017, 16 pages.

\* cited by examiner

DIGITAL SUPPRESSION OF TRANSMITTER INTERMODULATION IN RECEIVER

RELATED APPLICATIONS

This application is a Continuation of U.S. application Ser. No. 14/728,095, filed Jun. 2, 2015, now U.S. Pat. No. 9,509,365, which is a Continuation of U.S. application Ser. No. 13/932,307, filed Jul. 1, 2013, now U.S. Pat. No. 9,077,440, which is a Continuation-in-Part of U.S. application Ser. No. 13/734,250, filed Jan. 4, 2013, now U.S. Pat. No. 8,995,932, the disclosures of which are hereby incorporated herein by reference in their entireties.

FIELD OF THE DISCLOSURE

The present disclosure relates to transmitter noise suppression in a receiver.

BACKGROUND

The output of a transmitter contains a desired transmit signal as well as Intermodulation Distortion (IMD) and thermal noise. The IMD is caused by non-linear behavior of components in the transmitter such as, for example, a power amplifier. Various linearization techniques (e.g., digital predistortion) are utilized to minimize IMD and, in some cases, thermal noise. However, even after linearization, there is still some thermal noise and residual IMD in the output of the transmitter. In the case of a frequency division duplex system, some of the thermal noise and the IMD exists in a paired receive band (i.e., in a receive band of a co-located receiver). Specifically, FIG. 1 illustrates a frequency domain representation of a concurrent dual-carrier transmit signal where some type of linearization has been applied to the transmit band. The paired uplink channel in the receive band can be seen to be occupied by residual IMD and thermal noise that is generated in the transmitter.

In order to address this issue, currently, a transmit band filter at the output of the transmitter is specified to exhibit an adequately deep stop-band in the paired receive band. This deep stop-band reduces the amount of thermal noise and residual IMD that leaks from the output of the transmitter into the co-located receiver. The deep stop-band requirements of the transmit band filter result in several issues. Specifically, the requirement for the transmit band filter to exhibit a deep stop-band increases the number of resonators needed for the transmit band filter and increases the time needed to tune the transmit band filter. Further, increasing the number of resonators increases a size of the transmit band filter, increases an insertion loss of the transmit band filter, and makes the transmit band filter more costly to manufacture. As such, it is desirable to relax the deep stop-band requirements of the transmit band filter.

One technique that has been used to relax the deep stop-band requirements of the transmit band filter is active cancellation of transmitter noise from the input of the co-located receiver. As used herein, "transmitter noise" includes both residual IMD after any linearization and thermal noise. More specifically, FIG. 2 illustrates a communication node 10 including a transmitter 12 and a receiver 14 in which a feedforward architecture is utilized to suppress or cancel transmitter noise in a receive band of the receiver 14. The receiver 14 is referred to herein as being co-located with the transmitter 12. As used herein, the term "co-located" is used to indicate that a transmitter and a receiver are both located at, or included as part of, a single communication node.

As illustrated, the transmitter 12 includes a Digital-to-Analog Converter (DAC) 16, an upconversion subsystem 18, and a power amplifier (PA) 20 connected as shown. The DAC 16 converts a digital baseband transmit signal ($S_{TX}$) into an analog baseband transmit signal ($S_{TX,AG}$). The upconversion subsystem 18 upconverts the analog baseband transmit signal ($S_{TX,AG}$) to a desired radio frequency to provide an upconverted transmit signal ($S_{TX,UP}$). The power amplifier 20 amplifies the upconverted transmit signal ($S_{TX,UP}$) to thereby provide an analog radio frequency transmit signal ($S_{TX,RF}$) at an output of the transmitter 12. The analog radio frequency transmit signal ($S_{TX,RF}$) is provided to an antenna 22 of the communication node 10 via a duplexer 24.

The receiver 14 includes a Low Noise Amplifier (LNA) 26, a downconversion subsystem 28, and an Analog-to-Digital Converter (ADC) 30 connected as shown. The LNA 26 amplifies an analog radio frequency receive signal ($S_{RX,RF}$) received from the antenna 22 via the duplexer 24. A resulting amplified radio frequency receive signal ($S_{RX,AMP}$) is downconverted to baseband via the downconversion subsystem 28 to thereby provide an analog baseband receive signal ($S_{RX,AG}$). The analog baseband receive signal ($S_{RX,AG}$) is digitized by the ADC 30 to provide a digital baseband receive signal ($S_{RX}$) at an output of the receiver 14.

The analog radio frequency transmit signal ($S_{TX,RF}$) includes both a desired transmit signal in a transmit band of the transmitter 12 and transmitter noise. The transmitter noise includes thermal noise and IMD in a receive band of the receiver 14. The transmitter noise in the receive band of the receiver 14 leaks into the receiver 14 through the duplexer 24. In order to suppress or cancel the transmitter noise in the receive band of the receiver 14, the communication node 10 includes a feedforward transmit (TX) noise cancellation subsystem 32. As described in A. Roussel, C. W. Nicholls, and J. S. Wight, "Frequency agile bandstop filter (FABSF)," IEEE MTT-S International, pp. 1099-1102, June 2008 (hereinafter the "Roussel article"), the feedforward TX noise cancellation subsystem 32 includes a signal cancellation loop and an error cancellation loop. The signal cancellation loop is formed by couplers 34, 36, and 38, a complex gain element 40 (e.g., a Radio Frequency (RF) vector modulator), and a fixed delay line 42 connected as shown. The complex gain element 40 is tuned such that the signal cancellation loop cancels the desired signal from the analog radio frequency transmit signal ($S_{TX,RF}$) at the coupler 38 to thereby provide a signal that is representative of the transmitter noise to the error cancellation loop.

The error cancellation loop is formed by a complex gain element 44 (e.g., an RF vector modulator), an error amplifier 46, a coupler 48, and a fixed delay line 50 connected as shown. In the error cancellation loop, the signal output by the signal cancellation loop is adjusted by the complex gain element 44 and then recombined with the analog radio frequency transmit signal ($S_{TX,RF}$) at the coupler 48. The complex gain element 44 is tuned to cancel the transmitter noise in the receive band of the receiver 14. The fixed delay lines 42 and 50 are utilized to minimize a group delay mismatch between the two paths (i.e., the feedforward path and the main path).

Simulation results show that the feedforward TX noise cancellation subsystem 32 described in the Roussel article could cancel the transmit noise in the receive band by around 30 decibels (dB), but only over a 5 Megahertz (MHz)

bandwidth. As such, the feedforward TX noise cancellation subsystem 32 is not suitable for wideband or multiband applications such as, for example, Long Term Evolution (LTE) cellular communications networks. More specifically, the complex gain elements 40 and 44 use phase shifters or vector modulators. Phase shifters and vector modulators are limited in bandwidth and, as a result, limit the bandwidth of the feedforward TX noise cancellation subsystem 32. In addition to being limited in bandwidth, the feedforward TX noise cancellation subsystem 32 increases insertion losses via the fixed delay line 50 and the couplers 34, 36, and 48 in the radio frequency path.

FIG. 3 illustrates a communication node 52 that includes another prior art feedforward TX noise cancellation subsystem 54. Like the feedforward TX noise cancellation subsystem 32 of FIG. 2, the feedforward TX noise cancellation subsystem 54 has limited bandwidth and is therefore not suitable for use in wideband applications. The communication node 52 includes a transmitter 56 having a power amplifier 58 and a receiver 60 having an LNA 62 where the transmitter 56 and the receiver 60 are coupled to an antenna 64 via a duplexer 66. The feedforward TX noise cancellation subsystem 54 operates to cancel or suppress the transmit noise in the receive band of the receiver 60 as described in T. O'Sullivan, R. A. York, B. Noren, and P. M. Asbeck, "Adaptive duplexer implemented using single-path and multipath feedforward techniques with BST phase shifters," *IEEE Trans. on MTT*, vol. 53, no. 1, pp. 106-114, January 2005 (hereinafter the "O'Sullivan article").

More specifically, the feedforward TX noise cancellation subsystem 54 includes couplers 68 and 70, a notch filter 72, an amplifier 74, and a complex gain element 76 connected as shown. In general, the coupler 68 obtains a signal that corresponds to a radio frequency transmit signal output by the transmitter 56. The signal is passed through the notch filter 72 having a notch centered on a transmit band of the transmitter 56 to provide a filtered signal that is representative of the transmit noise in the receive band of the receiver 60. The notch filter 72 is desired to prevent the high power signal in the transmit band from pushing the subsequent components into non-linear operation. After the notch filter 72, the filtered signal is amplified and then adjusted in amplitude and phase before being combined back into the main path between the duplexer 66 and the receiver 60. The complex gain element 76 is tunable to permit feedforward attenuation to occur at any channel in the receive band. The duplexer 66, which is more specifically a Surface Acoustic Wave (SAW) duplexer, contributes to a relatively large group delay mismatch between the main path and the feedforward path. In feedforward systems, the attenuation bandwidth narrows as the group delay mismatch increases. In the O'Sullivan article, multiple feedforward paths were proposed in a parallel configuration for attenuation at multiple frequencies, or for a wider attenuation bandwidth.

In the O'Sullivan article, the fabrication and testing of the feedforward TX noise cancellation subsystem 54 for a single feedforward path was described. The transmit band was 824-849 MHz and the receive band was 869-894 MHz. The SAW duplexer 66 had 40 dB of TX-receive (RX) isolation in the receive band. The feedforward TX noise cancellation subsystem 54 increased the isolation by more than 20 dB over a 2 MHz channel bandwidth. This performance was reported for each channel in the receive band. The O'Sullivan article also described the fabrication and testing of the feedforward TX noise cancellation subsystem 54 with dual error, or feedforward, paths. Results for two different cases were reported. The first case placed the two frequency response nulls 9 MHz apart, and the resulting improved isolation was 9 dB over 16 MHz. The second case had a null spacing of 4 MHz, whereby the isolation increased by 20 dB over 4.5 MHz.

However, because the bandwidth of the complex gain element 76 is limited, the bandwidth of the feedforward TX noise cancellation subsystem 54 is limited and is therefore not suitable for wideband applications (e.g., greater than 20 MHz, greater than 40 MHz, or the like). In addition, the duplexer 66 is within the cancellation loop. Therefore, the main signal path includes both the stopband of the transmit filter of the duplexer 66 and the passband of the receive filter of the duplexer 66. As a result, the frequency response of the main signal path is far from that of a delay line, which is not favorable for feedforward cancellation. In other words, the duplexer 66 has a frequency dependent frequency response that is difficult, if not impossible, to model using only a single complex gain element 76 or a few parallel complex gain elements 76. Again, this limits the bandwidth of the feedforward TX noise cancellation subsystem 54.

FIG. 4 illustrates a communication node 78 that includes another prior art feedforward TX noise cancellation subsystem 80. Like the feedforward TX noise cancellation subsystems 32 and 54 of FIGS. 2 and 3, the feedforward TX noise cancellation subsystem 80 has limited bandwidth and is therefore not suitable for use in wideband applications. The communication node 78 includes a transmitter 82 having a power amplifier 84 and a receiver 86 having an LNA 88 where the transmitter 82 and the receiver 86 are coupled to an antenna 90 via a circulator 92. The feedforward TX noise cancellation subsystem 80 operates to cancel or suppress the transmit noise in the receive band of the receiver 86 as described in Kannangara and M. Faulkner, "Adaptive duplexer for multiband transceiver," *RAWCON Proceedings*, pp. 381-384, August 2003 (hereinafter the "Kannangara article").

More specifically, the feedforward TX noise cancellation subsystem 80 described in the Kannangara article includes couplers 94 and 96, a splitter 98, fixed delay lines 100 and 102, complex gain elements 104 and 106, and a combiner 108 connected as shown. In general, the coupler 94 obtains a signal that corresponds to a radio frequency transmit signal output by the transmitter 82. The signal is split by the splitter 98. The two split signals output by the splitter 98 are passed through the fixed delay lines 100 and 102 having delays $\tau_1$ and $\tau_2$ and the complex gain elements 104 and 106, respectively, and are then recombined by the combiner 108. The output of the combiner 108 is coupled to the input of the receiver 86. The complex gain elements 104 and 106 are tuned to provide cancellation of transmit noise in the receive band of the receiver 86.

In the Kannangara article, the feedforward TX noise cancellation subsystem 80 was developed to enhance a fixed circulator (i.e., the circulator 92) by improving duplexer isolation in both the transmit and receive bands. The fixed duplexer used for measurements in the Kannangara article provided at least 20 dB of isolation in both the transmit and receive bands. Measurements were made for a transmit band centered at 1955 MHz and a receive band centered at 2145 MHz. The feedforward TX noise cancellation subsystem 80 increased the transmit band isolation by 47 dB and the receive band isolation by 38 dB. The attenuation was measured over 5 MHz channel bandwidths.

The feedforward TX noise cancellation subsystem 80 disclosed in the Kannangara article is not suitable for wideband applications. Again, the bandwidth of the feedforward TX noise cancellation subsystem 80 is limited by the bandwidth of the complex gain elements 104 and 106. Another issue is that the feedforward TX noise cancellation subsystem 80 of Kannangara was designed for a mobile terminal. Higher power communication nodes (e.g., a base station) generate transmit signals having a much larger dynamic range. This would require complex gain elements with the same dynamic range in the feedforward paths, which is infeasible for typical high power communication node requirements.

As such, there is a need for systems and methods for suppressing leakage of thermal noise and IMD from the output of a transmitter into a co-located receiver that is suitable for wideband applications. In addition, there is a need for systems and methods for suppressing leaking of thermal noise and IMD from the output of a transmitter into a co-located receiver that is suitable for wideband, high-power applications.

SUMMARY

Systems and methods for suppressing transmitter noise in a receive band of a co-located receiver that are suitable for wideband applications are disclosed. Note, however, that while the systems and methods disclosed herein are suitable for wideband applications, the systems and methods disclosed herein are not limited thereto. In one embodiment, a system includes a transmitter, a main receiver, and a digital feedforward transmit noise cancellation subsystem. The transmitter is configured to upconvert and amplify a digital transmit signal to provide an analog radio frequency transmit signal at an output of the transmitter. The analog radio frequency transmit signal includes a desired signal in a transmit band of the transmitter and transmitter noise in a receive band of the main receiver. The main receiver is configured to amplify, downconvert, and digitize an analog radio frequency receive signal to provide a digital receive signal. The digital feedforward transmit noise cancellation subsystem is configured to process the digital transmit signal to generate a digital transmitter noise cancellation signal that is representative of the transmitter noise in the receive band and subtract the digital transmitter noise cancellation signal from the digital receive signal to thereby provide a compensated digital receive signal in which the transmitter noise has been suppressed or cancelled.

In one embodiment, the digital feedforward transmit noise cancellation subsystem includes a nonlinear transmitter model that processes the digital transmit signal to generate a digital baseband representation of the transmitter noise in a receive band of the main receiver at an output of an observation receiver that observes the output of the transmitter and a linear model that processes the digital baseband representation of the transmitter noise in the receive band of the main receiver to generate the digital transmitter noise cancellation signal that is representative of the transmitter noise in the receive band at a digital output of the main receiver.

In another embodiment, the digital feedforward transmit noise cancellation subsystem includes a nonlinear model that processes the digital transmit signal to generate the digital transmitter noise cancellation signal that is representative of the transmitter noise in the receive band at a digital output of the main receiver.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 5:
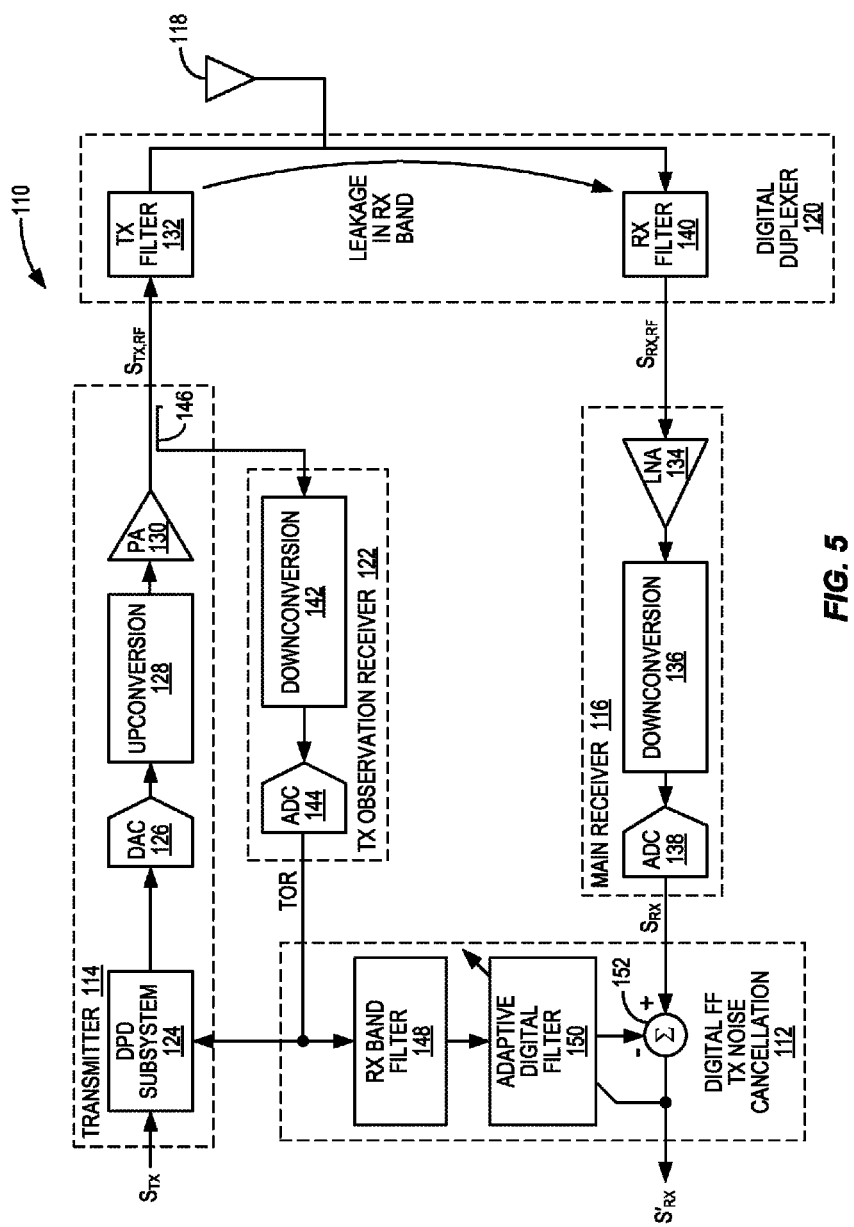
FIG. 5 illustrates a communication node that includes a feedforward transmit noise cancellation subsystem according to a first embodiment of the present disclosure.

Systems and methods for suppressing transmitter noise in a receive band of a co-located receiver that are suitable for wideband applications are disclosed. Note, however, that while the systems and methods disclosed herein are suitable for wideband applications, the systems and methods disclosed herein are not limited thereto. In this regard, FIG. 5 illustrates a communication node 110 that includes a digital feedforward (FF) transmit (TX) noise cancellation subsystem 112 that is suitable for wideband applications according to one embodiment of the present disclosure. As used herein, transmitter noise includes both Intermodulation Distortion (IMD) and thermal noise. The communication node 110 is any type of communication device or system such as, for example, a base station in a cellular communications network, a mobile terminal in a cellular communications network, or the like. The communication node 110 includes a transmitter 114 and a main receiver 116 coupled to an antenna 118 via a duplexer 120. The main receiver 116 is referred to herein as being co-located with the transmitter 114. As used herein, the term "co-located" is used to indicate that a transmitter and a receiver are both located at, or included as part of, a single communication node. In addition, the communication node 110 includes a TX observation receiver 122 and the digital feedforward TX noise cancellation subsystem 112 connected as shown.

In this embodiment, the transmitter 114 includes a Digital PreDistortion (DPD) subsystem 124, a Digital-to-Analog Converter (DAC) 126, an upconversion subsystem 128, and a power amplifier (PA) 130 connected as shown. While not illustrated, it should be understood that the transmitter 114 may additionally include one or more filtering and/or gain components. The DPD subsystem 124 predistorts a digital baseband transmit signal ($S_{TX}$) in order to compensate for non-linearity of the power amplifier 130 using a desired predistortion algorithm. The predistorted digital baseband transmit signal is then converted into a predistorted analog baseband transmit signal by the DAC 126 and upconverted and amplified by the upconversion subsystem 128 and the power amplifier 130 to provide an analog radio frequency transmit signal ($S_{TX,RF}$). The analog radio frequency transmit signal ($S_{TX,RF}$) includes both a desired signal in a transmit band of the transmitter 114 (i.e., a radio frequency representation of the digital baseband transmit signal ($S_{TX}$)) as well as thermal noise and residual IMD, which are referred to herein as transmitter noise. At least some of this transmitter noise falls within a receive band of the main receiver 116. The analog radio frequency transmit signal ($S_{TX,RF}$) is passed through a transmit filter 132 of the duplexer 120 to the antenna 118.

The main receiver 116 includes a Low Noise Amplifier (LNA) 134, a downconversion subsystem 136, and an Analog-to-Digital Converter (ADC) 138 connected as shown. While not illustrated, it should be understood that the main receiver 116 may additionally include one or more filtering and/or gain components. An input of the LNA 134 is coupled to the antenna 118 via a receive filter 140 of the duplexer 120. The LNA 134 amplifies an analog radio frequency receive signal ($S_{RX,RF}$) received from the receive filter 140. The amplified analog radio frequency receive signal ($S_{RX,RF}$) is then downconverted to baseband and analog-to-digital converted by the downconversion subsystem 136 and the ADC 138. A resulting digital receive signal ($S_{RX}$) is output by the main receiver 116. The digital receive signal ($S_{RX}$) is preferably at baseband, but may alternatively be at a Very Low Intermediate Frequency (VLIF). Due to leakage of the transmitter noise in the receive band into the main receiver 116 via the duplexer 120, the digital receive signal ($S_{RX}$) includes the transmitter noise in the receive band of the main receiver 116 or, more specifically, a baseband digital representation of the transmitter noise in the receive band of the main receiver 116.

The TX observation receiver 122 and the digital feedforward TX noise cancellation subsystem 112 operate to suppress or cancel the transmitter noise in the digital receive signal ($S_{RX}$). In this embodiment, the TX observation receiver 122 has a high dynamic range because the TX observation receiver 122 is used to sample the analog radio frequency transmit signal ($S_{TX,RF}$), including both the desired signal which is at a high power and the transmitter noise which is at a much lower power level (e.g., tens of decibels (dBs) less). The TX observation receiver 122 includes a downconversion subsystem 142 and an ADC 144 connected as shown. Note that while the TX observation receiver 122 is illustrated as including only the downconversion subsystem 142 and the ADC 144, the TX observation receiver 122 may include additional filtering and/or gain stages. An input of the TX observation receiver 122, and more specifically an input of the downconversion subsystem 142, is coupled to an output of the transmitter 114, or more specifically the output of the power amplifier 130, via a coupler 146.

Via the coupler 146, the TX observation receiver 122 receives a signal that corresponds to the analog radio frequency transmit signal ($S_{TX,RF}$) output by the transmitter 114. The signal is downconverted and digitized by the downconversion subsystem 142 and the ADC 144 to provide a TX observation receiver (TOR) output signal. In this embodiment, the TOR output signal is utilized as both a digital feedback signal for the DPD subsystem 124 and a digital feedforward signal for the digital feedforward TX noise cancellation subsystem 112. As such, a bandwidth of the TX observation receiver 122 is sufficiently wide to include both the transmit band of the transmitter 114 and the receive band of the main receiver 116.

In this embodiment, the digital feedforward signal (i.e., the TOR output signal) is a digital representation of the analog radio frequency transmit signal ($S_{TX,RF}$) including the desired signal in the transmit band as well as the transmitter noise in the receive band of the main receiver 116. The digital feedforward TX noise cancellation subsystem 112 includes a receive (RX) band filter 148, an adaptive digital filter 150, and a subtractor 152 connected as shown. The RX band filter 148 filters the digital feedforward signal to provide a filtered digital feedforward signal that is representative of the transmitter noise in the receive band of the main receiver 116. The filtered digital feedforward signal is then adaptively filtered by the adaptive digital filter 150 to provide a digital TX noise cancellation signal that approximates or is equal to the baseband digital representation of the transmitter noise in the digital receive signal ($S_{RX}$). The subtractor 152 then subtracts the digital TX noise cancellation signal from the digital receive signal ($S_{RX}$) to thereby provide a compensated digital receive signal ($S'_{RX}$) in which the transmitter noise has been suppressed or eliminated.

Figure 1:
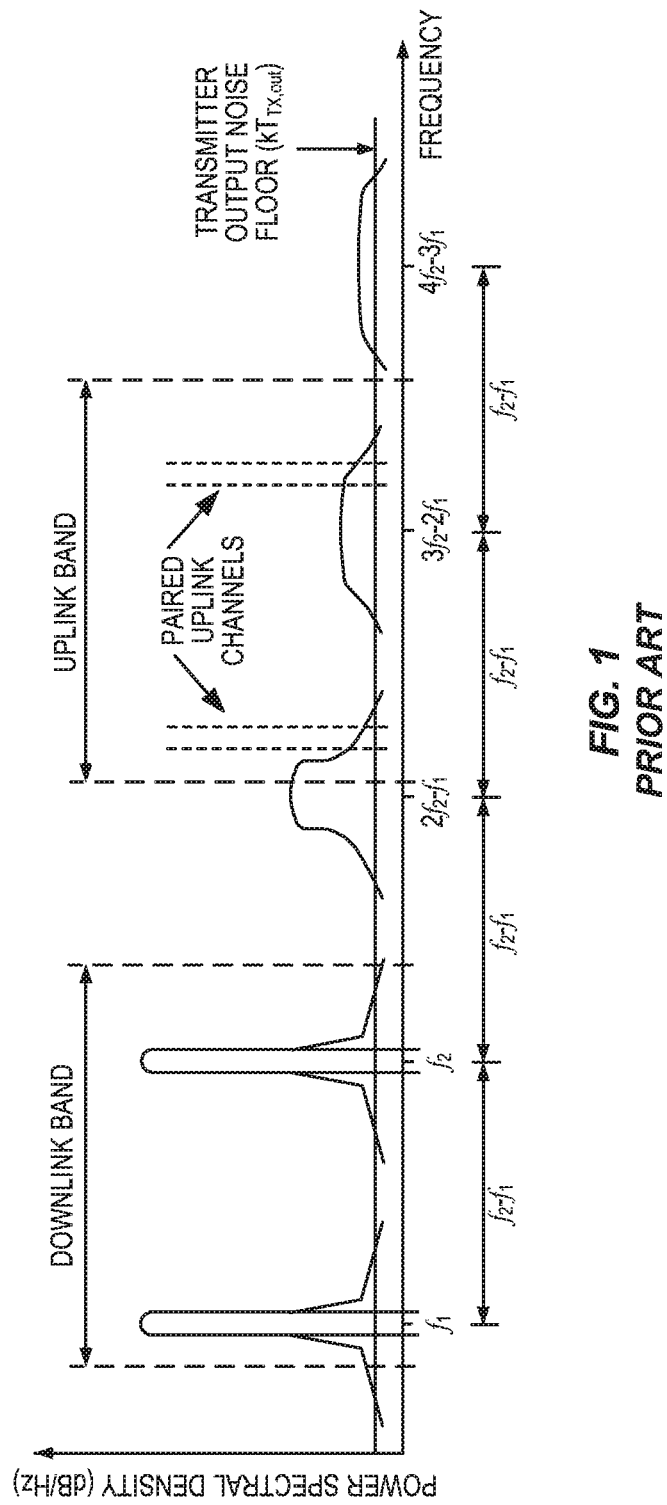
FIG. 1 is a frequency domain representation of a concurrent dual-carrier transmit signal output by a transmitter and residual Intermodulation Distortion (IMD) and thermal noise in a paired receive band of a co-located receiver.
Figure 2:
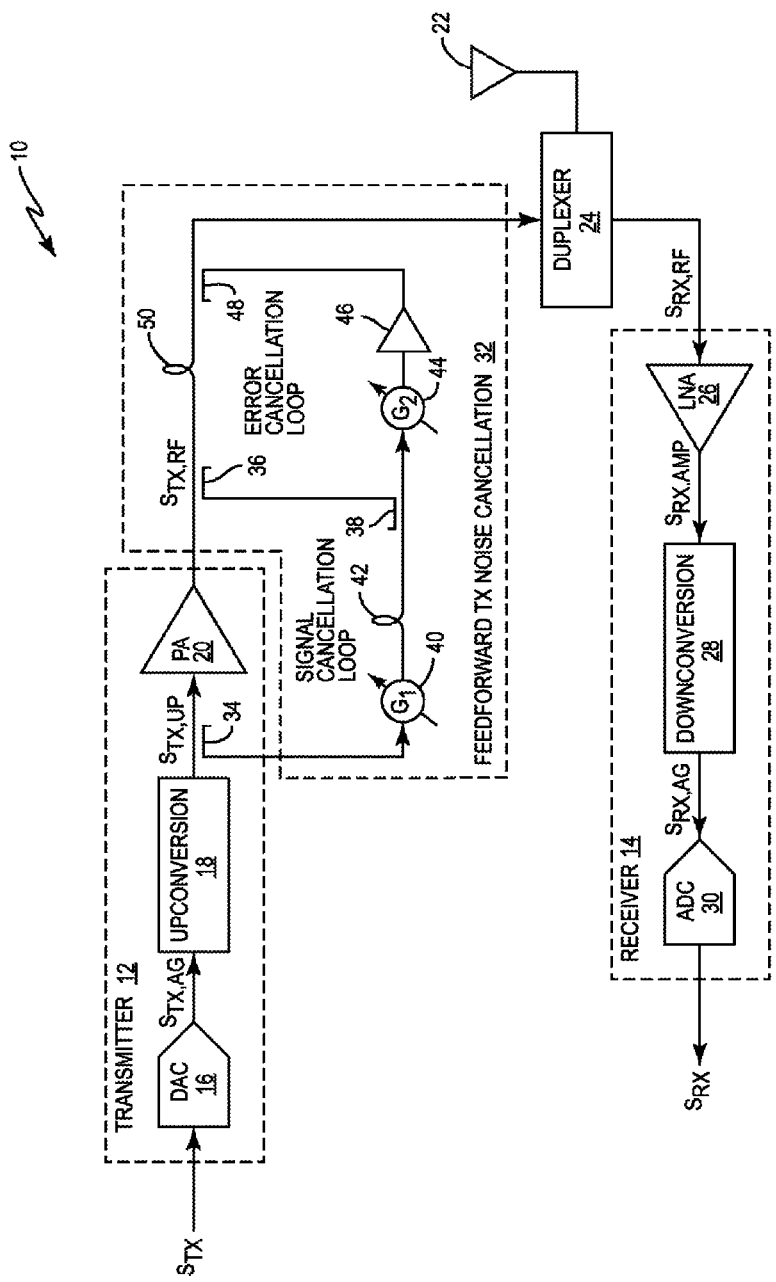
FIG. 2 illustrates a communication node that includes a feedforward transmit noise cancellation subsystem according to the prior art.
Figure 3:
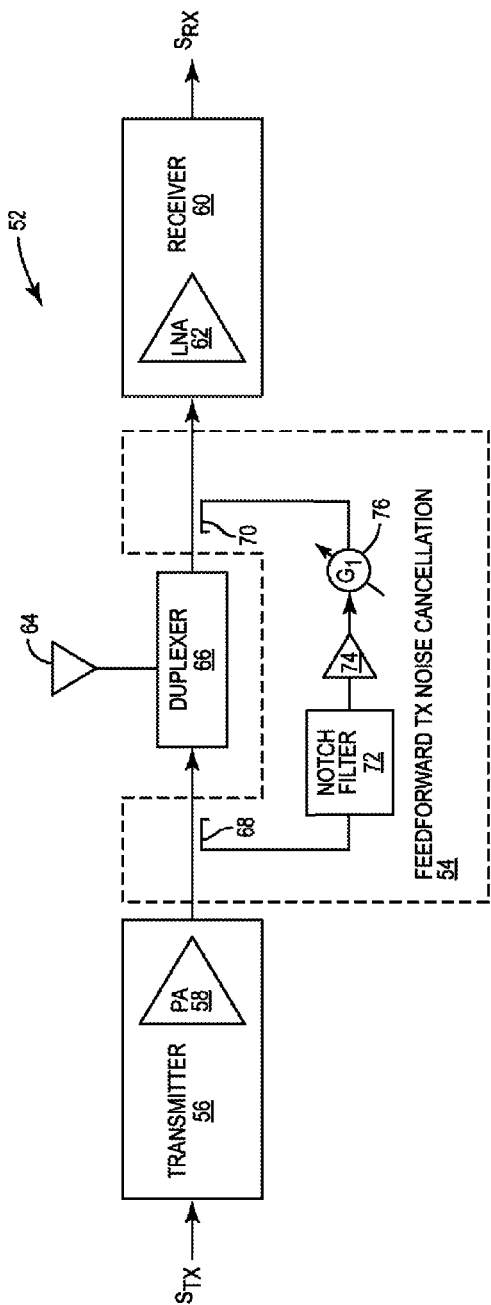
FIG. 3 illustrates a communication node that includes another feedforward transmit noise cancellation subsystem according to the prior art.
Figure 4:
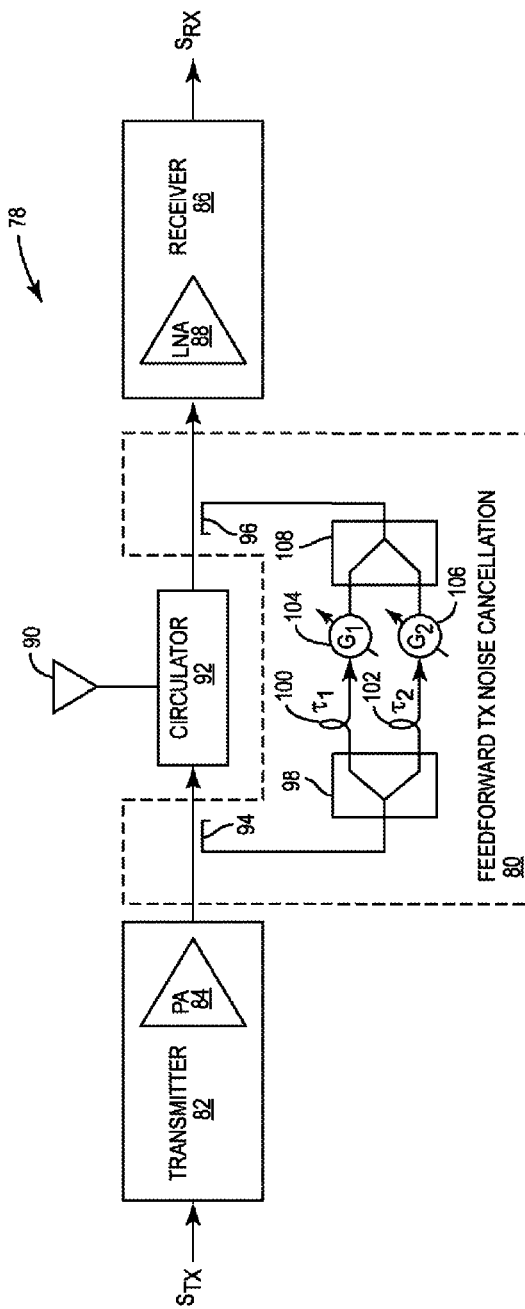
FIG. 4 illustrates a communication node that includes yet another feedforward transmit noise cancellation subsystem according to the prior art.

In one embodiment, the adaptive digital filter 150 is a Finite Impulse Response (FIR) filter. The adaptive digital filter 150 is adaptively configured using any suitable adaptation algorithm (e.g., Least-Mean Squares (LMS)) such that the transmit noise in the compensated digital receive signal ($S'_{RX}$) is minimized. For example, for LMS, an input signal for the LMS algorithm is the filtered digital feedforward signal output by the RX band filter 148, a reference signal for the LMS algorithm is the digital receive signal ($S_{RX}$) output by the main receiver 116, and an error signal for the LMS algorithm is the compensated digital receive signal ($S'_{RX}$). The adaptive digital filter 150 models a difference between the main path from the output of the transmitter 114 through the transmit filter 132 and the receive filter 140 of the duplexer 120 and the main receiver 116 and the feedforward path through the TX observation receiver 122 and the RX band filter 148. In this manner, the adaptive digital filter 150 equalizes the main and feedforward paths. Importantly, the adaptive digital filter 150 is an Nth order adaptive digital filter, where N is greater than or equal to 1 but can be large (e.g., 32 or more). Therefore, the adaptive digital filter 150 can accurately model the difference between the main path and the feedforward path over a wide bandwidth. For example, the adaptive digital filter 150 may accurately model the difference between the main path and the feedforward path over bandwidths greater than or equal to 20 Megahertz (MHz), greater than or equal to 40 MHz, or even greater bandwidths. In this manner, the digital feedforward TX noise cancellation subsystem 112 is suitable for wideband applications. It addition, the TX observation receiver 122 uses only a single coupler (i.e., the coupler 146) and, as such, significantly reduces insertion losses in the radio frequency path as compared to the prior art systems of FIGS. 2 through 4.

Figure 6:
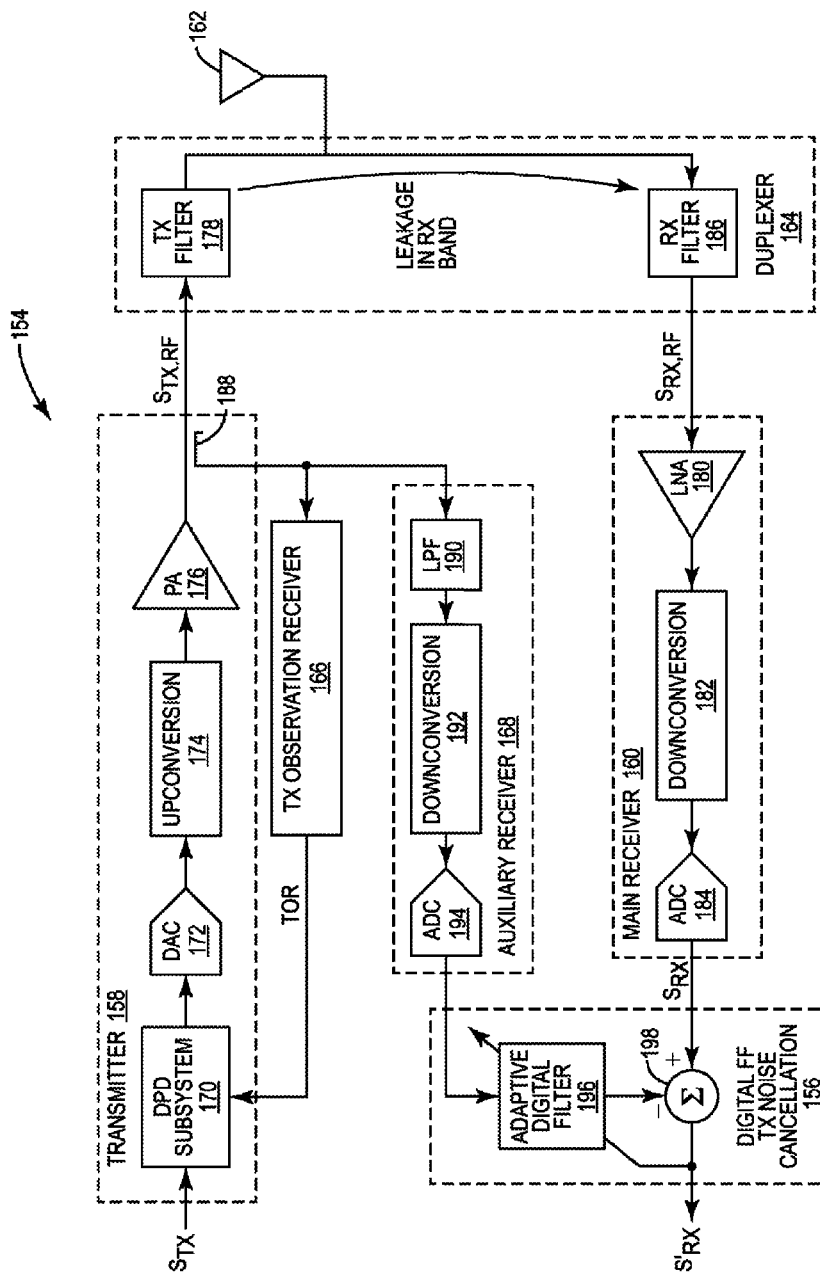
FIG. 6 illustrates a communication node that includes a feedforward transmit noise cancellation subsystem according to a second embodiment of the present disclosure.

FIG. 6 illustrates a communication node 154 that includes a digital feedforward TX noise cancellation subsystem 156 that is suitable for wideband applications according to a second embodiment of the present disclosure. This embodiment is similar to that of FIG. 5, but where the digital feedforward signal is generated separately from the feedback signal used to adaptively configure the digital predistortion. The communication node 154 is any type of communication device or system such as, for example, a base station in a cellular communications network, a mobile terminal in a cellular communications network, or the like. The communication node 154 includes a transmitter 158 and a main receiver 160 coupled to an antenna 162 via a duplexer 164. The main receiver 160 is referred to herein as being co-located with the transmitter 158. In addition, the communication node 154 includes a TX observation receiver 166, an auxiliary receiver 168, and the digital feedforward TX noise cancellation subsystem 156 connected as shown.

In this embodiment, the transmitter 158 includes a DPD subsystem 170, a DAC 172, an upconversion subsystem 174, and a power amplifier 176 connected as shown. While not illustrated, it should be understood that the transmitter 158 may additionally include one or more filtering and/or gain components. The DPD subsystem 170 predistorts a digital baseband transmit signal ($S_{TX}$) in order to compensate for non-linearity of the power amplifier 176 using a known predistortion algorithm. The predistorted digital transmit signal is then converted into a predistorted analog transmit signal by the DAC 172 and upconverted and amplified by the upconversion subsystem 174 and the power amplifier 176 to provide an analog radio frequency transmit signal ($S_{TX,RF}$). The analog radio frequency transmit signal ($S_{TX,RF}$) includes both a desired signal in a transmit band of the transmitter 158 (i.e., a radio frequency representation of the digital baseband transmit signal ($S_{TX}$)) as well as thermal noise and residual IMD, which are referred to herein as transmitter noise. At least some of this transmitter noise falls within a receive band of the main receiver 160. The analog radio frequency transmit signal ($S_{TX,RF}$) is passed through a transmit filter 178 of the duplexer 164 to the antenna 162.

The main receiver 160 includes an LNA 180, a downconversion subsystem 182, and an ADC 184 connected as shown. Notably, while not illustrated, the main receiver 160 may include additional filtering and/or gain stages. An input of the LNA 180 is coupled to the antenna 162 via a receive filter 186 of the duplexer 164. The LNA 180 amplifies an analog radio frequency receive signal ($S_{RX,RF}$) received from the receive filter 186. The amplified analog radio frequency receive signal is then downconverted to baseband and analog-to-digital converted by the downconversion subsystem 182 and the ADC 184. The resulting digital receive signal ($S_{RX}$) is output by the main receiver 160. However, due to leakage of the transmitter noise in the receive band into the main receiver 160 via the duplexer 164, the digital receive signal ($S_{RX}$) includes the transmitter noise or, more specifically, a baseband digital representation of the transmitter noise in the receive band.

The TX observation receiver 166 and the auxiliary receiver 168 are coupled to the output of the transmitter 158, and more specifically the output of the power amplifier 176, via a coupler 188. The TX observation receiver 166 receives a signal that is representative of the analog radio frequency transmit signal ($S_{TX,RF}$) from the coupler 188 and then filters, downconverts, and digitizes the signal to provide a TOR output signal to the DPD subsystem 170. The DPD subsystem 170 uses a desired adaptation algorithm to adaptively control a predistortion applied to the digital baseband transmit signal ($S_{TX}$).

The auxiliary receiver 168 and the digital feedforward TX noise cancellation subsystem 156 operate to suppress or cancel the transmitter noise in the digital receive signal ($S_{RX}$). In this embodiment, the auxiliary receiver 168 includes a lowpass filter (LPF) 190, a downconversion subsystem 192, and an ADC 194 connected as shown. Note that while the auxiliary receiver 168 is illustrated as including only the LPF 190, the downconversion subsystem 192, and the ADC 194, the auxiliary receiver 168 may include additional filtering and/or gain stages. An input of the auxiliary receiver 168, and more specifically an input of the LPF 190, is coupled to the output of the transmitter 158, or more specifically the output of the power amplifier 176, via the coupler 188. Via the coupler 188, the auxiliary receiver 168 receives a signal that corresponds to the analog radio frequency transmit signal ($S_{TX,RF}$) output by the transmitter 158. The signal is filtered by the LPF 190 to remove the desired signal (i.e., the desired high power transmit signal in the transmit band of the transmitter 158). Notably, in this embodiment, the receive band is lower than the transmit band and, therefore, the LPF 190 attenuates the signal in the transmit frequency band. The filtered signal output by the LPF 190 is downconverted and digitized by the downconversion subsystem 192 and the ADC 194 to provide a digital feedforward signal at the output of the auxiliary receiver 168.

In this embodiment, since the high power desired signal is removed by the LPF 190, the auxiliary receiver 168 does not need a large dynamic range. As such, the relatively weak transmitter noise in the receive band can be more accurately sampled since the auxiliary receiver 168 does not require significant headroom to avoid nonlinear behavior due to the much larger desired signal in the transmit band. Further, since the auxiliary receiver 168 only observes the receive band of the main receiver 160, the bandwidth of the auxiliary receiver 168 can be substantially less than that of the TX observation receiver 122 of FIG. 5.

Before proceeding, it should be noted that different filtering schemes may be utilized to attenuate the transmit frequency band depending on the relationship of the transmit and receive frequency bands and various design criteria. More specifically, while the LPF 190 is utilized in the embodiment of FIG. 6, a high pass filter may alternatively be used if the receive band is higher in frequency than the transmit band. As another alternative, a bandpass filter having a passband that includes the receive band may be used. In addition, while filtering is performed at radio frequency in the embodiment of FIG. 6, the filtering may alternatively be performed at a desired intermediate frequency or at analog baseband. Note, however, that only the components following the filter will have relaxed dynamic range requirements.

In this embodiment, the digital feedforward signal is a digital representation of the transmitter noise in the receive band of the main receiver 160. The digital feedforward TX noise cancellation subsystem 156 includes an adaptive digital filter 196 and a subtractor 198 connected as shown. The adaptive digital filter 196 filters the digital feedforward signal to provide a digital TX noise cancellation signal that approximates or is equal to the baseband digital representation of the transmitter noise in the digital receive signal ($S_{RX}$). The subtractor 198 then subtracts the digital TX noise cancellation signal from the digital receive signal ($S_{RX}$) to thereby provide a compensated digital receive signal ($S'_{RX}$) in which the transmitter noise has been suppressed or eliminated.

In one embodiment, the adaptive digital filter 196 is a FIR filter. The adaptive digital filter 196 is adaptively configured using any suitable adaptation algorithm (e.g., LMS) such that the transmit noise in the compensated digital receive signal ($S'_{RX}$) is minimized. For example, for LMS, an input signal for the LMS algorithm is the digital feedforward signal output by the auxiliary receiver 168, a reference signal for the LMS algorithm is the digital receive signal ($S_{RX}$) output by the main receiver 160, and an error signal for the LMS algorithm is the compensated digital receive signal ($S'_{RX}$). The adaptive digital filter 196 models a difference between the main path from the output of the transmitter 158 through the transmit filter 178 and the receive filter 186 of the duplexer 164 and the main receiver 160 and the feedforward path through the auxiliary receiver 168. In this manner, the adaptive digital filter 196 equalizes the main and feedforward paths. Importantly, the adaptive digital filter 196 is an Nth order adaptive digital filter, where N can be large (e.g., 32 or more). Therefore, the adaptive digital filter 196 can accurately model the difference between the main path and the feedforward path over a wide bandwidth. For example, the adaptive digital filter 196 may accurately model the difference between the main path and the feedforward path over bandwidths greater than or equal to 20 MHz, greater than or equal to 40 MHz, or even greater bandwidths. In this manner, the digital feedforward TX noise cancellation subsystem 156 is suitable for wideband applications.

Figure 7:
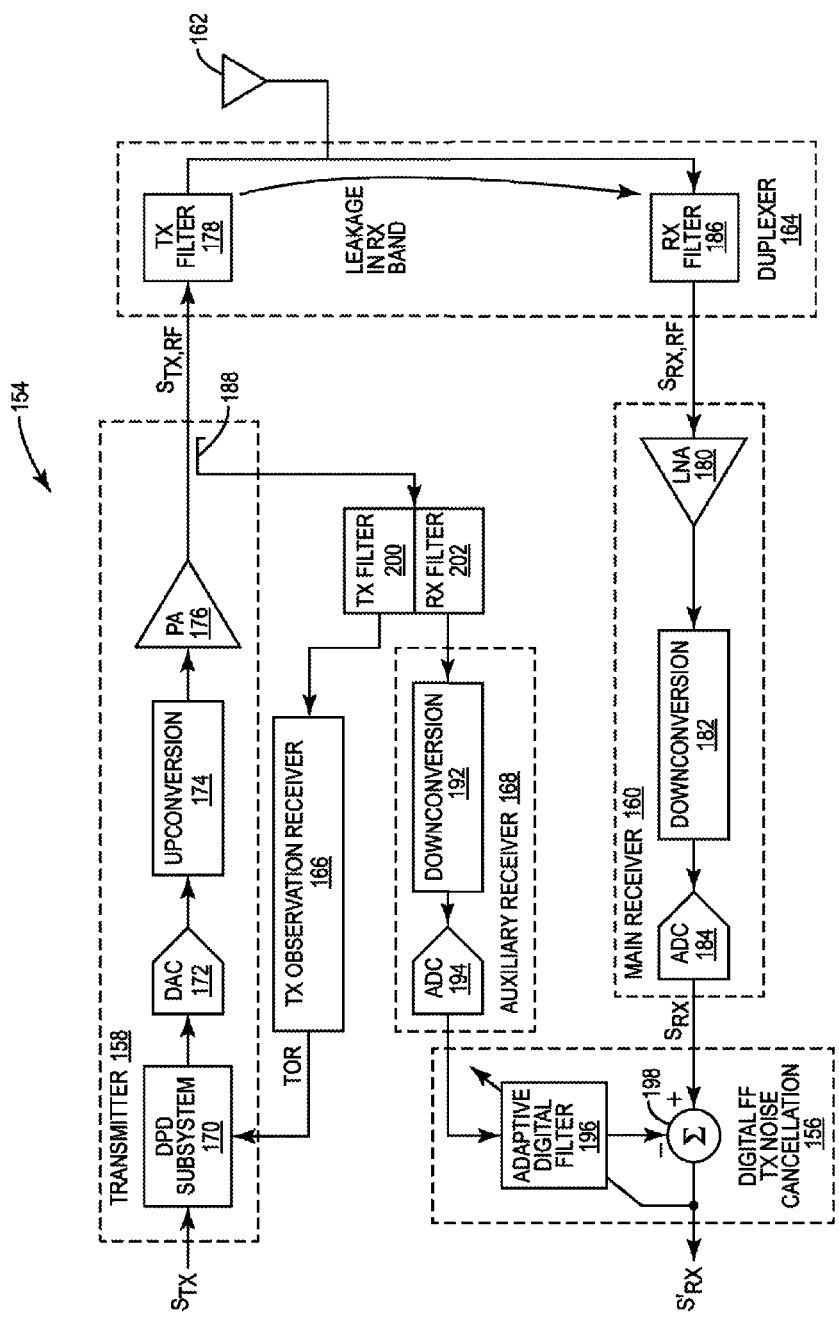
FIG. 7 illustrates a communication node that includes a feedforward transmit noise cancellation subsystem according to a third embodiment of the present disclosure.

FIG. 7 illustrates the communication node 154 that includes the digital feedforward TX noise cancellation subsystem 156 that is suitable for wideband applications according to a third embodiment of the present disclosure. This embodiment is substantially the same as that of FIG. 6. However, in this embodiment, filtering is provided by transmit and receive filters 200 and 202. The transmit and receive filters 200 and 202 may be implemented as a duplexer. The transmit and receive filters 200 and 202 may be, for example, bandpass filters. The transmit filter 200 filters the signal from the coupler 188 to provide a filtered signal that corresponds to the desired signal in the transmit frequency band of the transmitter 158, which is then processed by the TX observation receiver 166. Likewise, the receive filter 202 filters the signal from the coupler 188 to provide a filtered signal that corresponds to the transmitter noise in the receive band, which is then processed by the auxiliary receiver 168.

Figure 8:
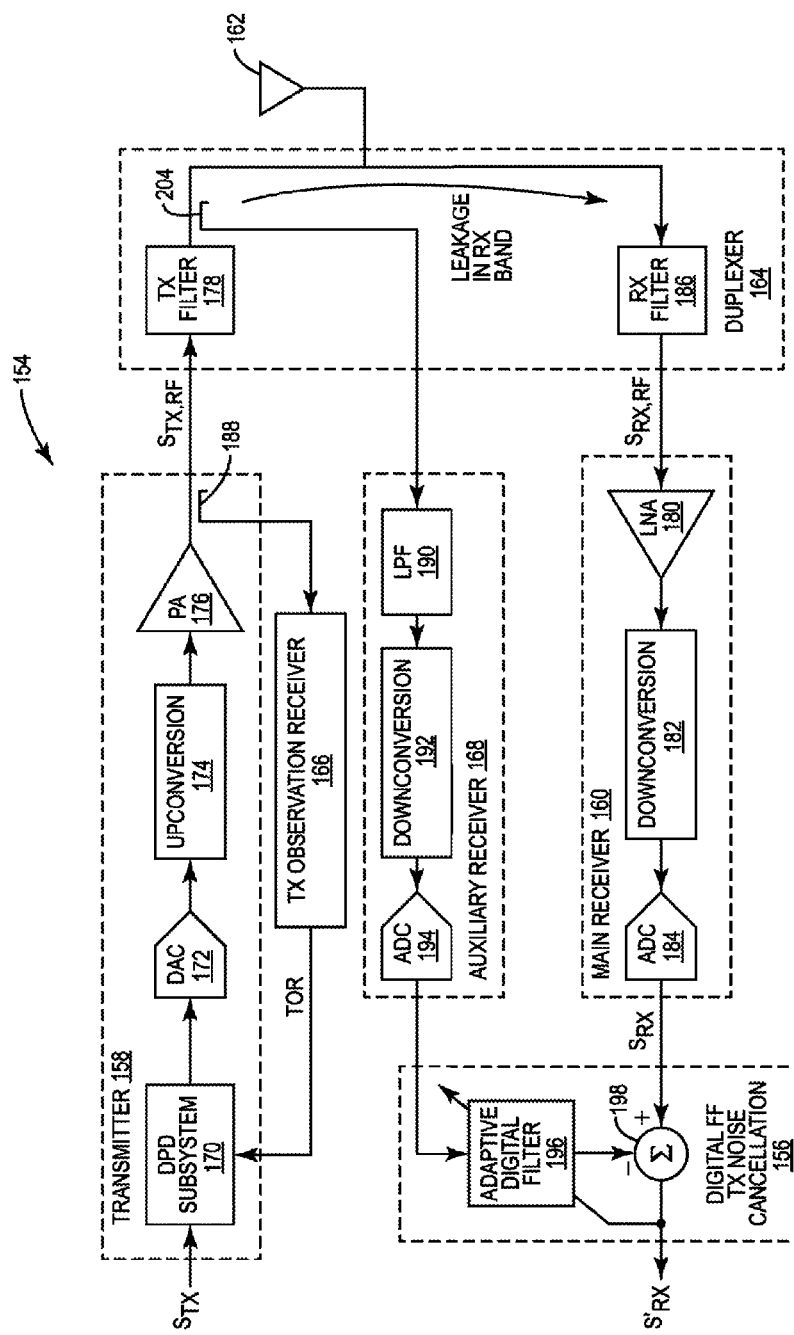
FIG. 8 illustrates a communication node that includes a feedforward transmit noise cancellation subsystem according to a fourth embodiment of the present disclosure.

FIG. 8 illustrates the communication node 154 that includes the digital feedforward TX noise cancellation subsystem 156 that is suitable for wideband applications according to a fourth embodiment of the present disclosure. This embodiment is substantially the same as that of FIG. 6. However, in this embodiment, the input of the auxiliary receiver 168 is connected to a coupler 204 at an output of the transmit filter 178 of the duplexer 164. It should be noted that, in the same manner, the coupler 146 of FIG. 5 may be moved to the output of the transmit filter 132.

Figure 9:
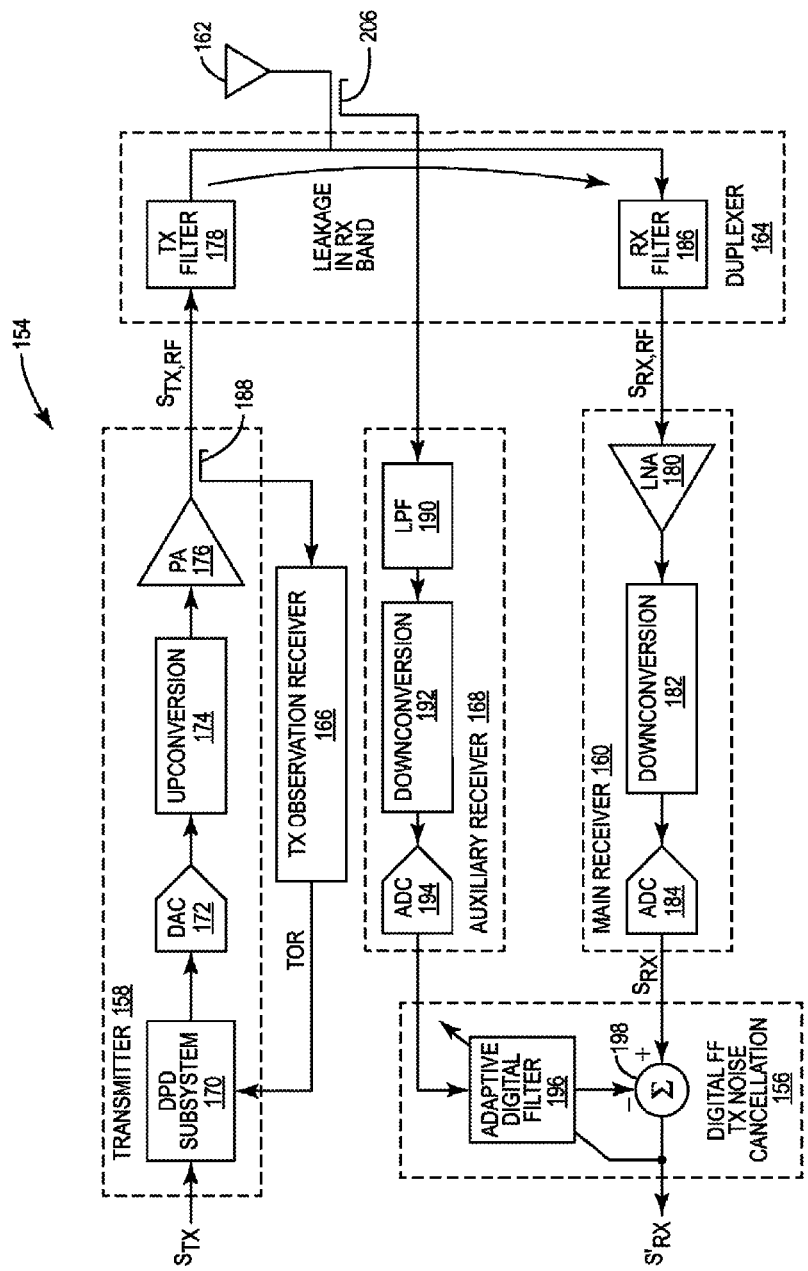
FIG. 9 illustrates a communication node that includes a feedforward transmit noise cancellation subsystem according to a fifth embodiment of the present disclosure.

FIG. 9 illustrates the communication node 154 that includes the digital feedforward TX noise cancellation subsystem 156 that is suitable for wideband applications according to a fifth embodiment of the present disclosure. This embodiment is substantially the same as that of FIG. 6. However, in this embodiment, the input of the auxiliary receiver 168 is connected to a coupler 206 at an output of the duplexer 164. It should be noted that, in the same manner, the coupler 146 of FIG. 5 may be moved to the output of the duplexer 120. Notably, the embodiments of FIGS. 8 and 9 are such that any passive IMD in the transmit filter 178 or the duplexer 164 can also be cancelled by the digital feedforward TX noise cancellation subsystem 156. However, the additional coupler 204, 206 adds insertion loss.

Figure 10:
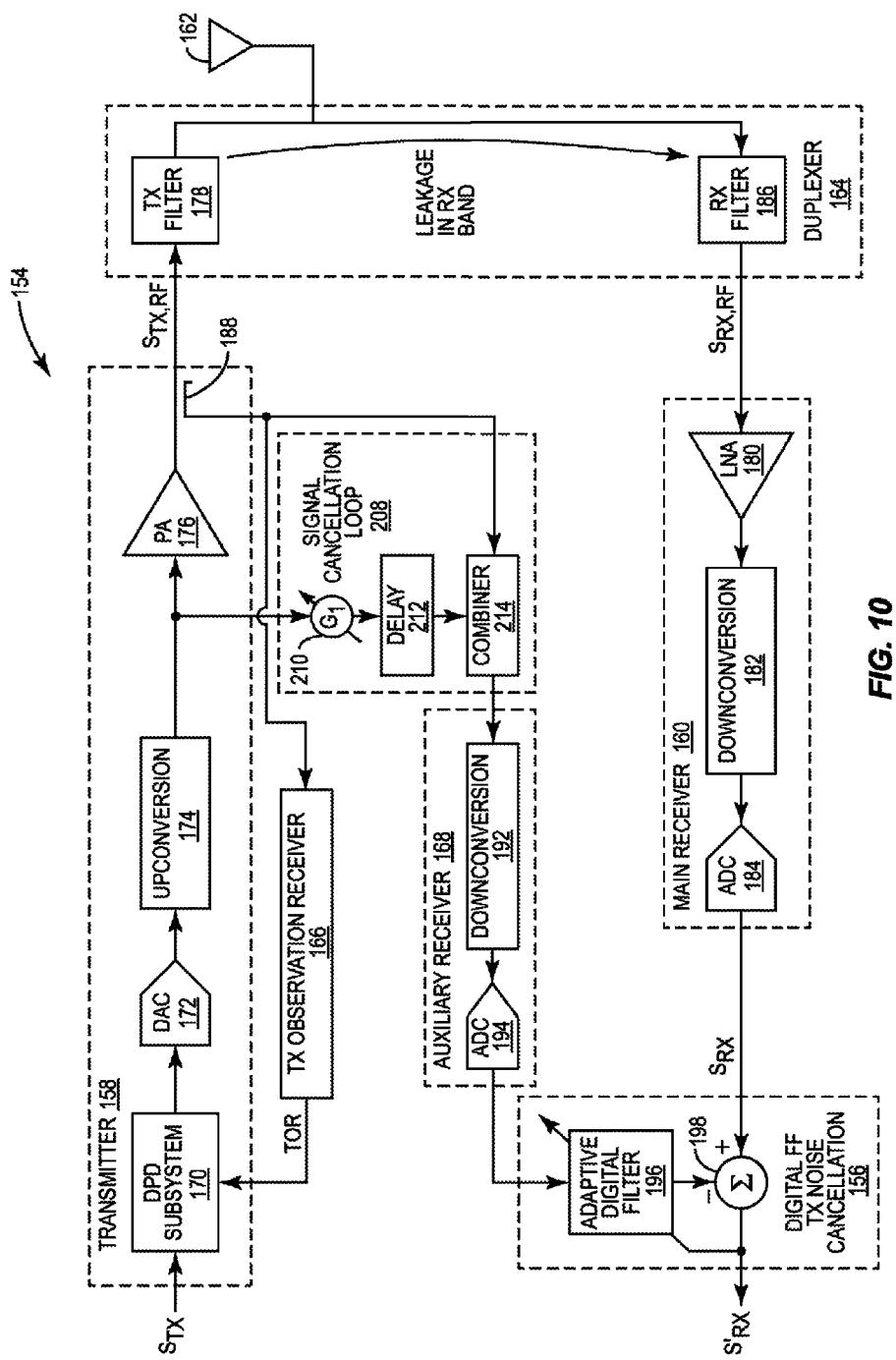
FIG. 10 illustrates a communication node that includes a feedforward transmit noise cancellation subsystem according to a sixth embodiment of the present disclosure.

FIG. 10 illustrates the communication node 154 that includes the digital feedforward TX noise cancellation subsystem 156 that is suitable for wideband applications according to a sixth embodiment of the present disclosure. This embodiment is substantially the same as that of FIG. 6. However, in this embodiment, the LPF 190 is replaced with a signal cancellation loop 208. The signal cancellation loop 208 operates to actively cancel the desired signal in the transmit band from the signal obtained by the coupler 188 such that an input signal to the auxiliary receiver 168 corresponds to the transmit noise. In this embodiment, the signal cancellation loop 208 includes a complex gain element 210, a delay 212, and a combiner 214 connected as shown. The complex gain element 210 is configured such that the desired signal is cancelled from the signal provided by the coupler 188. Notably, the complex gain element 210 could alternatively be placed in the other path directly before the PA 176.

Figure 11:
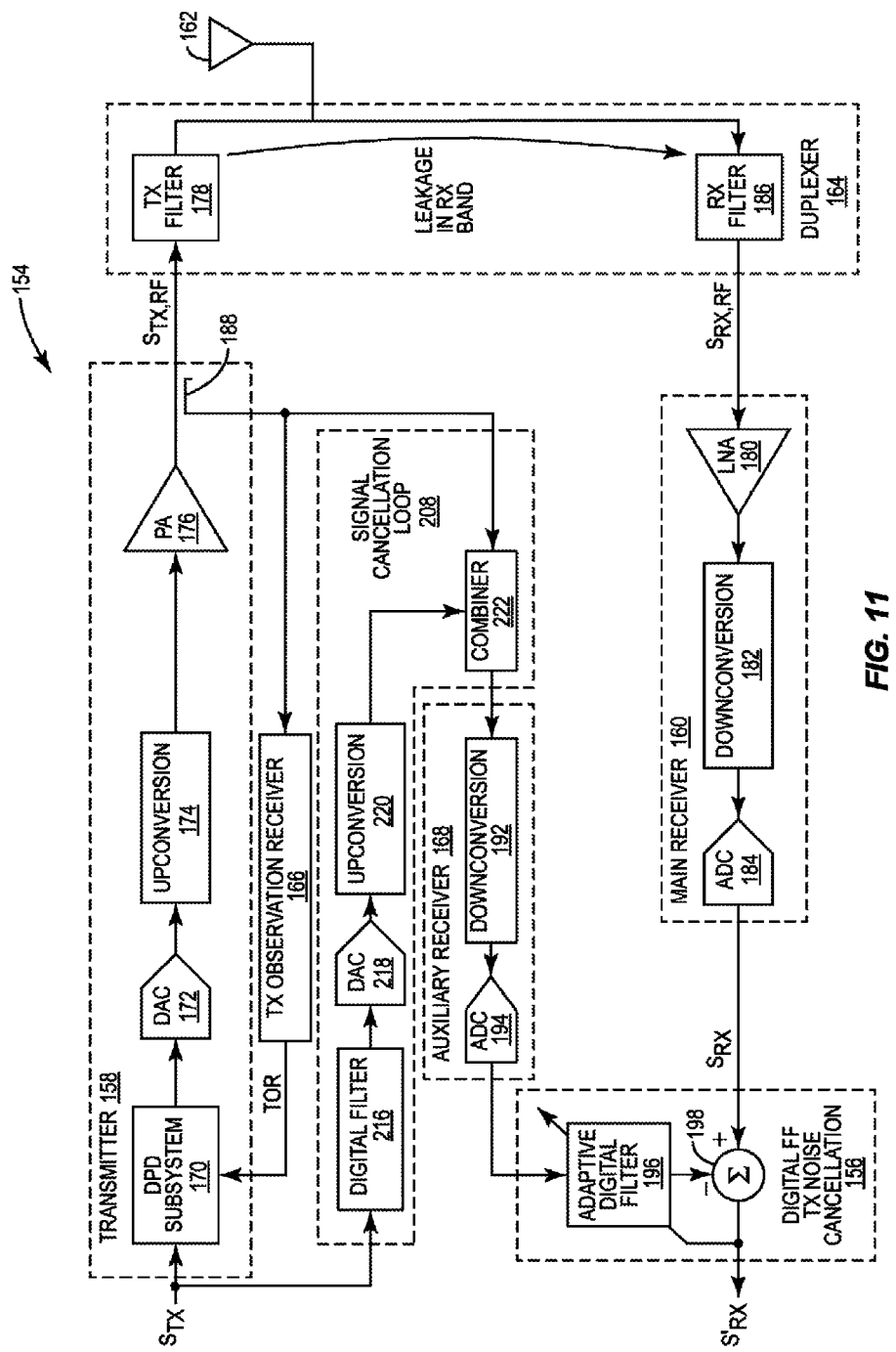
FIG. 11 illustrates a communication node that includes a feedforward transmit noise cancellation subsystem according to a seventh embodiment of the present disclosure.

FIG. 11 illustrates the communication node 154 that includes the digital feedforward TX noise cancellation subsystem 156 that is suitable for wideband applications according to a seventh embodiment of the present disclosure. This embodiment is substantially the same as that of FIG. 10. However, in this embodiment, the signal cancellation loop 208 includes a digital filter 216 (e.g., an FIR filter), a DAC 218, an upconversion subsystem 220, and a combiner 222 connected as shown. In operation, the digital filter 216, the DAC 218, and the upconversion subsystem 220 operate as a secondary transmitter that generates a signal that corresponds to the desired signal in the transmit band output by the transmitter 158 but is 180° out-of-phase with the desired signal in the transmit band. The digital filter 216 is configured to compensate for a difference between the path from the input of the transmitter 158 to the input of the combiner 222 connected to the coupler 188 and the path from the input of the transmitter 158 to the other input of the combiner 222 connected to the output of the upconversion subsystem 220. In operation, the digital transmit signal ($S_{TX}$) passes through the digital filter 216, the DAC 218, and the upconversion subsystem 220 to provide the signal that corresponds to the desired signal in the transmit band output by the transmitter 158 but is 180° out-of-phase with the desired signal in the transmit band. As a result, when the two signals are combined by the combiner 222, the desired signal is cancelled. The output signal of the combiner 222 is then downconverted and digitized by the auxiliary receiver 168 to thereby provide the digital feedforward signal that is a digital representation of the transmitter noise in the receive band of the main receiver 160. While not illustrated, it should be understood that the signal cancellation loop 208 may additionally include one or more filtering and/or gain components.

Figure 12:
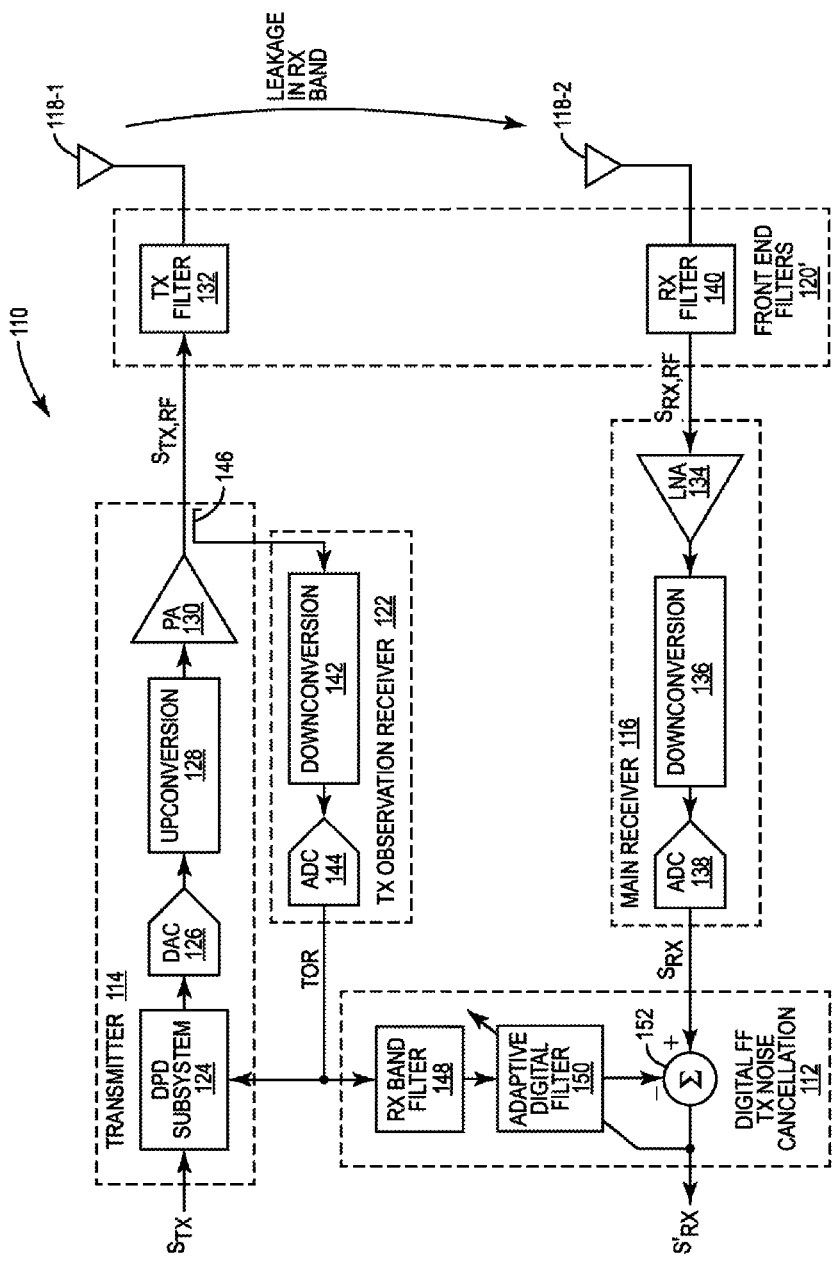
FIG. 12 illustrates an alternative embodiment of the communication node of FIG. 5 wherein the communication node includes separate transmit and receive antennas.

FIG. 12 illustrates an alternative embodiment of the communication node 110 of FIG. 5 that includes separate transmit and receive antennas 118-1 and 118-2. In this embodiment, the duplexer 120 of FIG. 5 is replaced with front end filters 120' including the transmit filter 132 and the receive filter 140. In this case, leakage in the receive band occurs from the transmit antenna 118-1 to the receive antenna 118-2. In the same manner, alternative embodiments of the communication node 154 of FIGS. 6 through 11 may have separate transmit and receive antennas.

Figure 13:
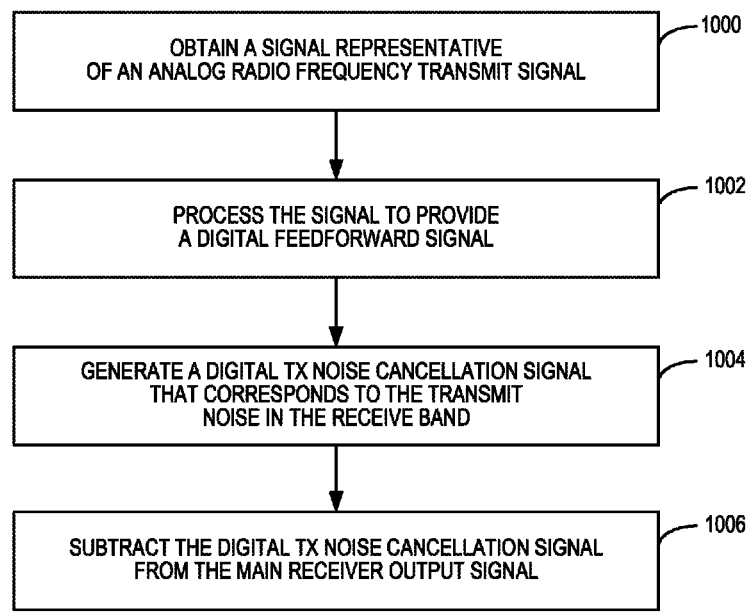
FIG. 13 is a flow chart that illustrates a process for feedforward transmit noise cancellation according to one embodiment of the present disclosure.

FIG. 13 is a flow chart that illustrates a process for suppressing transmit noise leakage between a co-located transmitter and receiver according to one embodiment of the present disclosure. First, a signal that is representative of an analog radio frequency transmit signal is obtained (step 1000). In the embodiments above, the signal is obtained via a coupler located at the output of the transmitter, the output of the transmit filter in the duplexer, or the output of the duplexer. Next, the signal is processed to provide a digital feedforward signal (step 1002). In one embodiment, the signal is downconverted and digitized to provide the digital feedforward signal in which case the digital feedforward signal is a digital baseband representation of the analog radio frequency transmit signal. In another embodiment, the signal is filtered, downconverted, and digitized to provide the digital feedforward signal in which case the digital feedforward signal is a digital baseband representation of the transmit noise in the analog radio frequency transmit signal. In yet another embodiment, the signal is passed through a signal cancellation loop that removes the desired signal in the transmit band, and the resulting signal after passing through the signal cancellation loop is downconverted and digitized to provide the digital feedforward signal. In this case, the digital feedforward signal is again a digital baseband representation of the transmit noise in the analog radio frequency transmit signal.

A digital TX noise cancellation signal is then generated based on the digital feedforward signal (step 1004). The digital TX noise cancellation signal corresponds to transmit noise in a receive band of the receiver. As discussed above, the digital TX noise cancellation signal is generated by an adaptive digital filter that adaptively filters the digital feedforward signal or a filtered version of the digital feedforward signal depending on the particular embodiment. Note that the adaptation of the adaptive digital filter may be performed continuously or intermittently. It is advantageous to run intermittently if the frequency responses of the secondary receiver (i.e., either the TX observation receiver or the auxiliary receiver that generates the digital feedforward signal) and the main receiver are not quickly changing with time, and if the frequencies of the transmit signals in the transmit band are not changing. Under this condition, the adaptation can be paused to reduce power consumption. Lastly, the digital TX noise cancellation signal is subtracted from a main receiver output signal (i.e., a digital receive signal output by the main receiver) to provide a compensated receive signal (step 1006).

Figure 14:
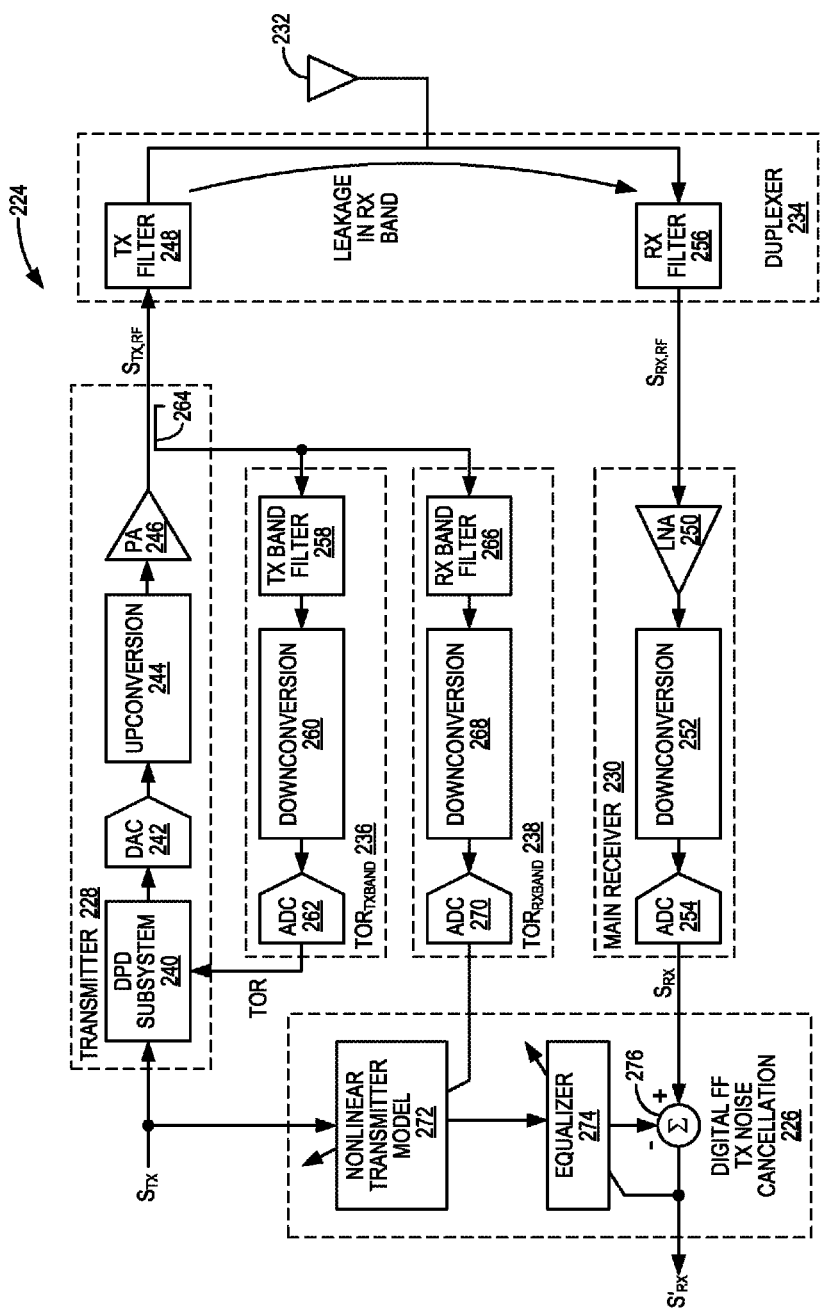
FIG. 14 illustrates a communication node that includes a feedforward transmit noise cancellation subsystem according to another embodiment of the present disclosure.

FIG. 14 illustrates a communication node 224 according to another embodiment of the present disclosure. As illustrated, the communication node 224 includes a digital feedforward TX noise cancellation subsystem 226 that is suitable for wideband applications according to one embodiment of the present disclosure. The communication node 224 is any type of communication device or system such as, for example, a base station in a cellular communications network, a mobile terminal in a cellular communications network, or the like. The communication node 224 includes a transmitter 228 and a main receiver 230 coupled to an antenna 232 via a duplexer 234. The main receiver 230 is referred to herein as being co-located with the transmitter 228. In addition, the communication node 224 includes a TX observation receiver ($TOR_{TXBAND}$) 236 that observes a transmit band of the transmitter 228, a TX observation receiver ($TOR_{RXBAND}$) 238, and the digital feedforward TX noise cancellation subsystem 226 connected as shown.

In this embodiment, the transmitter 228 includes a DPD subsystem 240, a DAC 242, an upconversion subsystem 244, and a power amplifier 246 connected as shown. While not illustrated, it should be understood that the transmitter 228 may additionally include one or more filtering and/or gain components. It should also be noted that the DPD subsystem 240 and the TX observation receiver 236 that observes the transmit band of the transmitter 228 are optional. The DPD subsystem 240 predistorts a digital baseband transmit signal ($S_{TX}$) in order to compensate for non-linearity of the power amplifier 246 using a desired predistortion algorithm. The predistorted digital baseband transmit signal is then converted into a predistorted analog baseband transmit signal by the DAC 242 and upconverted and amplified by the upconversion subsystem 244 and the power amplifier 246 to provide an analog radio frequency transmit signal ($S_{TX,RF}$). The analog radio frequency transmit signal ($S_{TX,RF}$) includes both a desired signal in a transmit band of the transmitter 228 (i.e., a radio frequency representation of the digital baseband transmit signal ($S_{TX}$)) as well as thermal noise and residual IMD, which are referred to herein as transmitter noise. At least some of this transmitter noise falls within a receive band of the main receiver 230. The analog radio frequency transmit signal ($S_{TX,RF}$) is passed through a transmit filter 248 of the duplexer 234 to the antenna 232.

It should be noted that the residual IMD in the receive band will generally be 10's of dB lower than the desired transmit signal at the output of the transmitter 228. A small portion of this relatively weak signal will leak into the main receiver 230 through the duplexer 234. It is assumed that this leaked signal is sufficiently weak so as to not push any of the components of the main receiver 230 into nonlinear operation. The output of the main receiver 230 is therefore a digital signal that contains both a desired receive signal and the leaked transmitter noise in the receive band. It is further assumed that the residual IMD is much stronger than the thermal noise, which is realistic particularly for concurrent multi-band transmitters.

The main receiver 230 includes an LNA 250, a downconversion subsystem 252, and an ADC 254 connected as shown. While not illustrated, it should be understood that the main receiver 230 may additionally include one or more filtering and/or gain components. An input of the LNA 250 is coupled to the antenna 232 via a receive filter 256 of the duplexer 234. The LNA 250 amplifies an analog radio frequency receive signal ($S_{RX,RF}$) received from the receive filter 256. The amplified analog radio frequency receive signal ($S_{RX,RF}$) is then downconverted to baseband and analog-to-digital converted by the downconversion subsystem 252 and the ADC 254. A resulting digital receive signal ($S_{RX}$) is output by the main receiver 230. The digital receive signal ($S_{RX}$) is preferably at baseband, but may alternatively be at a VLIF. Due to leakage of the transmitter noise in the receive band into the main receiver 230 via the duplexer 234, the digital receive signal ($S_{RX}$) includes the transmitter noise in the receive band of the main receiver 230 or, more specifically, a baseband digital representation of the transmitter noise in the receive band of the main receiver 230.

The TX observation receiver 236 operates to provide a digital feedback signal that is utilized to configure the DPD subsystem 240. The TX observation receiver 236 includes a TX band filter 258, a downconversion subsystem 260, and an ADC 262 connected as shown. Notably, the TX band filter 258 is illustrated separately for clarity. However, it should be appreciated that the TX band filter 258 may alternatively be included in the downconversion subsystem 260. Further, while the TX observation receiver 236 is illustrated as including only the TX band filter 258, the downconversion subsystem 260, and the ADC 262, the TX observation receiver 236 may include additional filtering and/or gain stages. An input of the TX observation receiver 236, and more specifically an input of the TX band filter 258, is coupled to an output of the transmitter 228, or more specifically the output of the power amplifier 246, via a coupler 264. Via the coupler 264, the TX observation receiver 236 receives a signal that corresponds to the analog radio frequency transmit signal ($S_{TX,RF}$) output by the transmitter 228. The signal is filtered by the TX band filter 258 and then downconverted and digitized by the downconversion subsystem 260 and the ADC 262 to provide a TOR output signal for the TX band. In this embodiment, the TOR output signal is utilized as a digital feedback signal for the DPD subsystem 240.

The TX observation receiver 238 for the receive band of the main receiver 230 and the digital feedforward TX noise cancellation subsystem 226 operate to suppress or cancel the transmitter noise in the digital receive signal ($S_{RX}$). In this embodiment, the TX observation receiver 238 is used to sample the transmitter noise in the analog radio frequency transmit signal ($S_{TX,RF}$), where the transmitter noise is at a much lower power level (e.g., tens of decibels (dBs) less) than the desired transmit signal in the transmit band of the transmitter 228. The TX observation receiver 238 for the receive band includes a RX band filter 266, a downconversion subsystem 268, and an ADC 270 connected as shown. Notably, the RX band filter 266 is illustrated separately for clarity. However, it should be appreciated that the RX band filter 266 may alternatively be included in the downconversion subsystem 268. Further, while the TX observation receiver 238 is illustrated as including only the RX band filter 266, the downconversion subsystem 268, and the ADC 270, the TX observation receiver 238 may include additional filtering and/or gain stages.

An input of the TX observation receiver 238, and more specifically an input of the RX filter 266, is coupled to the output of the transmitter 228, or more specifically the output of the power amplifier 246, via the coupler 264. Via the coupler 264, the TX observation receiver 238 receives a signal that corresponds to the analog radio frequency transmit signal ($S_{TX,RF}$) output by the transmitter 228. The signal is filtered by the RX band filter 266 to obtain a signal that corresponds to the transmitter noise in the receive band of the main receiver 230. The signal output by the RX band filter 266 is then downconverted and digitized by the downconversion subsystem 268 and the ADC 270 to provide a TOR output signal for the receive band of the main receiver 230. The TOR output signal for the receive band is a digital representation of the transmitter noise in the receive band of the main receiver 230 at the output of the transmitter 228. As discussed below, the TOR output signal for the receive band is utilized by the digital feedforward TX noise cancellation subsystem 226.

The digital feedforward TX noise cancellation subsystem 226 includes a nonlinear transmitter model 272, an equalizer 274 (which is also referred to herein as a linear model), and a subtractor 276 connected as shown. The nonlinear transmitter model 272 operates as a model of a signal path from an input of the transmitter 228 (i.e., the input to which the digital transmit signal ($S_{TX}$) is provided) to an output of the TX observation receiver 238 for the receive band. Thus, in this embodiment, the nonlinear transmitter model 272 models the signal path from the input of the transmitter 228 through the transmitter 228 including the nonlinearity of the power amplifier 246 and through the TX observation receiver 238 for the receive band. The nonlinear transmitter model 272 is implemented using any suitable digital nonlinear model(s) such as, for instance, a Volterra model(s) or similar model(s) (e.g., a memory polynomial(s), a generalized memory polynomial(s), or an orthogonal polynomial(s)), a block-based model(s) (e.g., different combinations of Hammerstein and Wiener blocks), or a look-up table based model(s). The nonlinear transmitter model 272 is trained using any suitable training technique for the nonlinear transmitter model 272 based on the TOR output signal output by the TX observation receiver 238 for the receive band. Importantly, once the nonlinear transmitter model 272 is trained, the TX observation receiver 238 can be turned off (or otherwise inactive) or potentially switched or connected to another transmitter (e.g., where the TX observation receiver 238 can serve as a single TX observation receiver 238 for multiple transmitters). The TX observation receiver 238 can then be turned back on or activated when the nonlinear transmitter model 272 is to be trained or updated.

The equalizer 274 operates as a linear model of a leakage path of the transmitter noise in the receive band of the main receiver 230 from the output of the transmitter 228 through the duplexer 234 to the output of the main receiver 230. In addition, the equalizer 274 models an inverse of the signal path from the output of the transmitter 228 through the TX observation receiver 238 for the receive band such that the cascade of the nonlinear transmitter model 272 and the linear model of the equalizer 274 is not representative of a frequency response of the TX observation receiver 238. In one embodiment, the equalizer 274 is implemented as an adaptive filter that is trained using an adaptive algorithm (e.g., LMS algorithm) based on a compensated digital receive signal ($S'_{RX}$) output by the subtractor 276. In one particular embodiment, the adaptive filter is a FIR filter, which is easily adapted and inherently stable.

In operation, the digital transmit signal ($S_{TX}$) is processed by the nonlinear transmitter model 272 to generate a digital baseband representation of the transmitter noise in the receive band of the main receiver 230 at the output of the TX observation receiver 238. The digital baseband representation of the transmitter noise is then processed by the equalizer 274 to generate a digital TX noise cancellation signal that approximates or is equal to a baseband digital representation of the transmitter noise in the digital receive signal ($S_{RX}$). The subtractor 276 then subtracts the digital TX noise cancellation signal from the digital receive signal ($S_{RX}$) to thereby provide the compensated digital receive signal ($S'_{RX}$) in which the transmitter noise has been suppressed or eliminated.

In one embodiment, the equalizer 274 is a FIR filter. The adaptive digital filter is adaptively configured using any suitable adaptation algorithm (e.g., LMS) such that the transmit noise in the compensated digital receive signal ($S'_{RX}$) is minimized. For example, for LMS, an input signal for the LMS algorithm is the TOR output signal from the TX observation receiver 238 for the receive band, a reference signal for the LMS algorithm is the digital receive signal ($S_{RX}$) output by the main receiver 230, and an error signal for the LMS algorithm is the compensated digital receive signal ($S'_{RX}$). In this manner, the adaptive digital filter equalizes the main and feedforward paths. Importantly, the adaptive digital filter is an Nth order adaptive digital filter, where N is greater than or equal to 1 but can be large (e.g., 32 or more). Therefore, the adaptive digital filter can accurately model the difference between the main path and the feedforward path over a wide bandwidth. For example, the adaptive digital filter may accurately model the difference between the main path and the feedforward path over bandwidths greater than or equal to 20 MHz, greater than or equal to 40 MHz, or even greater bandwidths. In this manner, the digital feedforward TX noise cancellation subsystem 226 is suitable for wideband applications. In addition, only a single coupler (i.e., the coupler 264) is utilized and, as such, insertion losses in the radio frequency path are significantly reduced as compared to the prior art systems of FIGS. 2 through 4.

Before proceeding, it should be noted that while the communication node 224 of FIG. 14 includes two TORs, namely, the TX observation receiver 236 and the TX observation receiver 238, the communication node 224 may alternatively include a single TOR that switches between the transmit band (to provide the digital feedback signal for the DPD subsystem 240) and the receive band (to provide the digital feedback signal for the digital feedforward TX noise cancellation subsystem 226). As another alternative, a single wideband TOR may be used to simultaneously observe both the transmit band and the receive band. Digital filtering could then be used to separate the observed signals for the transmit band (for the DPD subsystem 240) and the receive band (for the digital feedforward TX noise cancellation subsystem 226).

Figure 15:
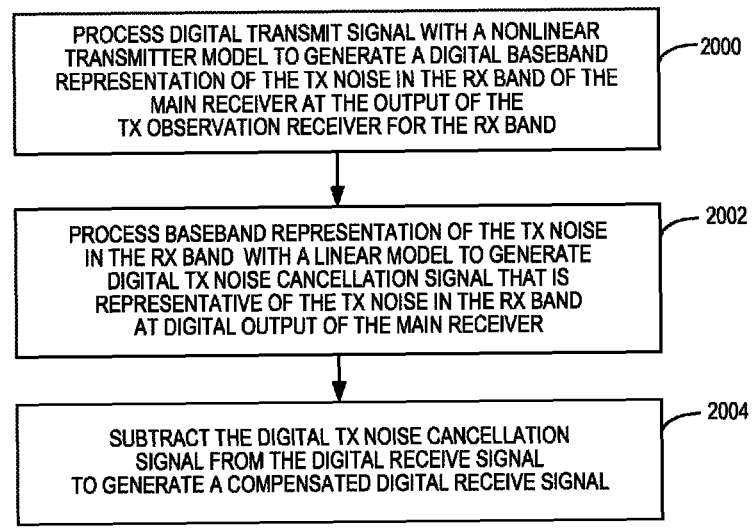
FIG. 15 is a flow chart that illustrates the operation of the feedforward transmit noise cancellation subsystem of FIG. 14 according to one embodiment of the present disclosure.

FIG. 15 is a flow chart that illustrates the operation of the digital feedforward TX noise cancellation subsystem 226 of FIG. 14 according to one embodiment of the present disclosure. As illustrated, the digital feedforward TX noise cancellation subsystem 226 processes the digital transmit signal ($S_{TX}$) of the transmitter 228 with the nonlinear transmitter model 272 to generate a digital baseband representation of the transmitter noise in the receive band of the main receiver 230 at the output of TX observation receiver 238 (step 2000). The digital baseband representation of the transmitter noise is then processed by the equalizer 274, or linear model, to generate a digital TX noise cancellation signal that approximates or is equal to a baseband digital representation of the transmitter noise in the digital receive signal ($S_{RX}$) (step 2002). The digital TX noise cancellation signal is then subtracted from the digital receive signal ($S_{RX}$) to thereby provide the compensated digital receive signal ($S'_{RX}$) in which the transmitter noise has been suppressed or eliminated (step 2004).

Figure 16:
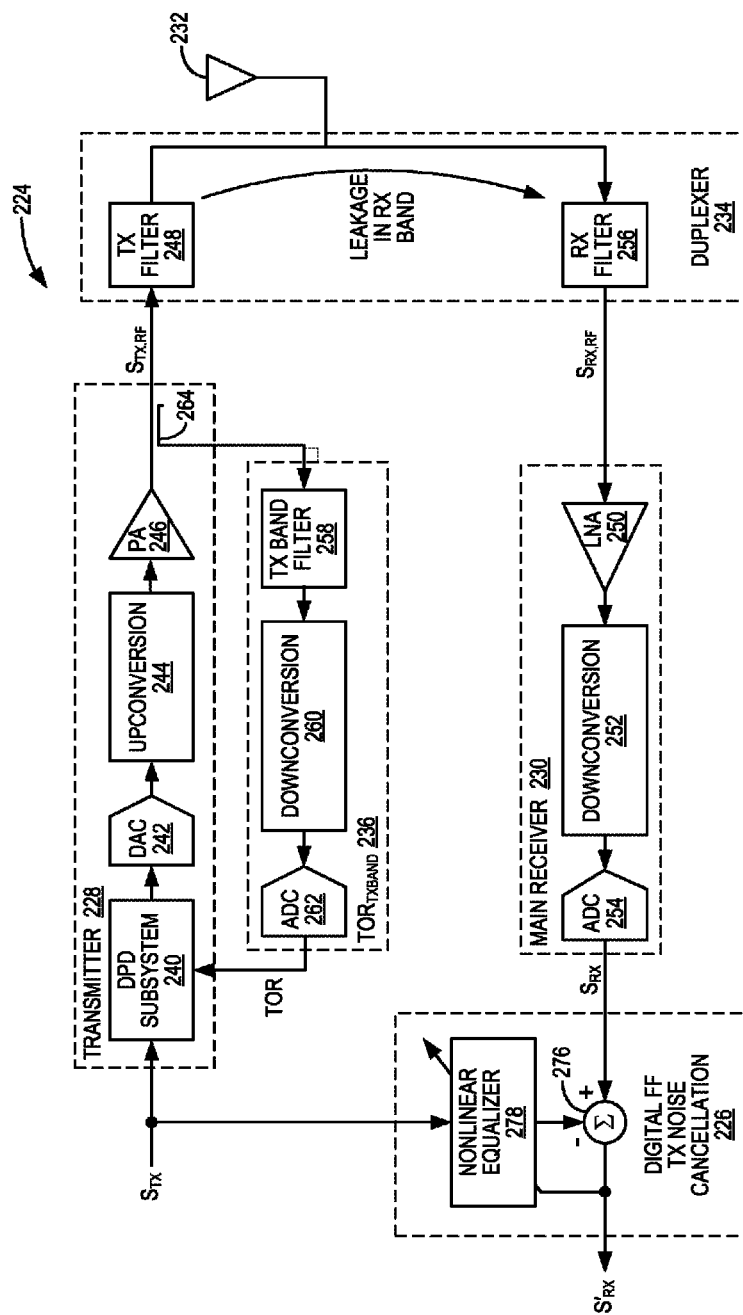
FIG. 16 illustrates a communication node that includes a feedforward transmit noise cancellation subsystem according to another embodiment of the present disclosure.

FIG. 16 illustrates the communication node 224 according to another embodiment of the present disclosure. This embodiment is similar to that of FIG. 14 but where the digital feedforward TX noise cancellation subsystem 226 includes a nonlinear equalizer 278 that effectively merges the nonlinear transmitter model 272 and the equalizer 274 of the embodiment of FIG. 14. As such, there is no need for a TOR for the receive band to provide a training signal for the digital feedforward TX noise cancellation system 226.

More specifically, the nonlinear equalizer 278 models a cascade of a signal path from the input of the transmitter 228 to the output of the transmitter 228 and a leakage path for the transmitter noise at the output of the transmitter 228 through the duplexer 234 to the output of the main receiver 230. The nonlinear equalizer 278 may be implemented using any suitable digital nonlinear model(s) such as, for instance, a Volterra model(s) or similar model(s) (e.g., a memory polynomial(s), a generalized memory polynomial(s), or an orthogonal polynomial(s)), a block-based model(s) (e.g., different combinations of Hammerstein and Wiener blocks), or a look-up table based model(s). The nonlinear equalizer 278 is trained using any suitable training technique based on the compensated digital receive signal ($S'_{RX}$) output by the subtractor 276. It should be noted that while the transmitter 228 and the main receiver 230 of the embodiments of the communication node 224 illustrated in FIGS. 14 and 16 are connected to the same antenna 232, the communication node 224 is not limited thereto. For instance, the transmitter 228 and the main receiver 230 may be connected to different antennas, where the leakage path includes a signal path between the different antennas.

Figure 17:
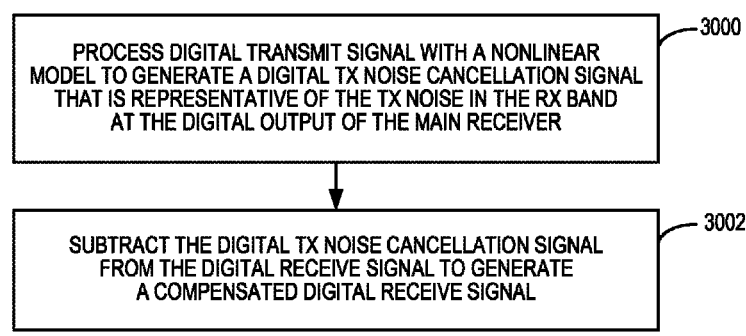
FIG. 17 is a flow chart that illustrates the operation of the feedforward transmit noise cancellation subsystem of FIG. 16 according to one embodiment of the present disclosure.

FIG. 17 is a flow chart that illustrates the operation of the digital feedforward TX noise cancellation subsystem 226 of FIG. 16 according to one embodiment of the present disclosure. As illustrated, the digital feedforward TX noise cancellation subsystem 226 processes the digital transmit signal ($S_{TX}$) of the transmitter 228 with a nonlinear model implemented by the nonlinear equalizer 278 to generate a digital TX noise cancellation signal that approximates or is equal to a baseband digital representation of the transmitter noise in the digital receive signal ($S_{RX}$) (step 3000). The digital TX noise cancellation signal is then subtracted from the digital receive signal ($S_{RX}$) to thereby provide the compensated digital receive signal ($S'_{RX}$) in which the transmitter noise has been suppressed or eliminated (step 3002).

The embodiments of the communication node 224 illustrated in FIGS. 14 and 16 provide many advantages. While not being limited by any particular advantage, as an example, the embodiment of the communication node 224 illustrated in FIG. 14 provides an advantage in that the nonlinear transmitter model 272 will quickly converge to an optimal solution during training. The linear model implemented by the equalizer 274 will converge slower since its training signal may also contain live traffic. However, the linear model converges faster than a nonlinear model using a training signal that contains live traffic. As another example, the embodiment of the communication node 224 illustrated in FIG. 16 provides all digital feedforward transmit noise cancellation and, as such, there are no additional requirements for a TOR associated with digital feedforward transmit noise cancellation.

The following acronyms are used throughout this disclosure.
ADC Analog-to-Digital Converter
DAC Digital-to-Analog Converter
dB Decibel
DPD Digital PreDistortion
FF Feedforward
FIR Finite Impulse Response
IMD Intermodulation Distortion
LMS Least-Mean Squares
LNA Low Noise Amplifier
LPF Lowpass Filter
LTE Long Term Evolution
MHz Megahertz
PA Power Amplifier
RF Radio Frequency
RX Receive
SAW Surface Acoustic Wave
TOR Transmit Observation Receiver
TX Transmit
VLIF Very Low Intermediate Frequency Those skilled in the art will recognize improvements and modifications to the preferred embodiments of the present disclosure. All such improvements and modifications are considered within the scope of the concepts disclosed herein and the claims that follow.

What is claimed is:

1. A system comprising:
a digital feedforward transmit noise cancellation subsystem configured to:
receive a copy of a digital transmit signal input to a transmitter;
generate a digital transmitter noise cancellation signal representative of transmitter noise in a receive band of a main receiver at a digital output of the main receiver based on the digital transmit signal input to a transmitter; and
cancel the transmitter noise from a digital receive signal that is output by the main receiver by applying the generated digital transmitter noise cancellation signal to the digital receive signal that is output by the main receiver to provide a compensated digital receive signal,
wherein the digital feedforward transmit noise cancellation subsystem comprises a nonlinear model that processes the digital transmit signal to generate a representation of the transmitter noise in the receive band of the main receiver.

2. The system of claim 1 wherein the digital feedforward transmit noise cancellation subsystem cancels the transmitter noise from the digital receive signal by subtracting the digital transmitter noise cancellation signal from the digital receive signal that is output by the main receiver.

3. The system of claim 1 wherein the digital feedforward transmit noise cancellation subsystem further comprises a linear model,
wherein the nonlinear model processes the digital transmit signal to generate a digital baseband representation of the transmitter noise in the receive band of the main receiver at an output of an observation receiver that observes an output of the transmitter; and
wherein the linear model processes the digital baseband representation of the transmitter noise in the receive band of the main receiver at the output of the transmitter to generate the digital transmitter noise cancellation signal representative of the transmitter noise in the receive band of the main receiver at the digital output of the main receiver.

4. The system of claim 3 wherein the linear model is trained based on the compensated digital receive signal.

5. The system of claim 3 wherein the linear model is a model of a leakage path of the transmitter noise in the receive band of the main receiver from the output of the transmitter to the digital output of the main receiver.

6. The system of claim 1 wherein the nonlinear model processes the digital transmit signal to generate the digital transmitter noise cancellation signal representative of the transmitter noise in the receive band of the main receiver at the digital output of the main receiver.

7. The system of claim 6 wherein the nonlinear model is a model of a signal path from an input of the transmitter to an output of the transmitter and a leakage path of the transmitter noise in the receive band of the main receiver from the output of the transmitter to the digital output of the main receiver.

8. The system of claim 6 wherein the nonlinear model is trained based on the compensated digital receive signal.

9. A method comprising:
receiving a copy of a digital transmit signal input to a transmitter;
using a nonlinear model to process the copy of the digital transmit signal to generate a digital transmitter noise cancellation signal representative of transmitter noise in a receive band of a main receiver at a digital output of the main receiver based on the digital transmit signal input to a transmitter; and
cancelling the transmitter noise from a digital receive signal by applying the generated digital transmitter noise cancellation signal to the digital receive signal that is output by the main receiver to provide a compensated digital receive signal.

10. The method of claim 9 wherein cancelling the transmitter noise from the digital receive signal that is output by the main receiver comprises subtracting the digital transmitter noise cancellation signal from a digital receive signal provided at the digital output of the main receiver.

11. The method of claim 10 wherein generating the digital transmitter noise cancellation signal comprises:
processing the digital transmit signal with the nonlinear model to generate a digital baseband representation of the transmitter noise in the receive band of the main receiver at an output of the transmitter; and
processing the digital baseband representation of the transmitter noise in the receive band of the main receiver at the output of the transmitter with a linear model to generate the digital transmitter noise cancellation signal representative of the transmitter noise in the receive band of the main receiver at the digital output of the main receiver.

12. The method of claim 11 further comprising:
observing an analog radio frequency transmit signal output by the transmitter in the receive band of the main receiver to provide a digital baseband feedback signal; and
training the nonlinear model based on the digital baseband feedback signal.

13. The method of claim 10 wherein generating the digital transmitter noise cancellation signal comprises processing the digital transmit signal with the nonlinear model to generate the digital transmitter noise cancellation signal representative of the transmitter noise in the receive band of the main receiver at the digital output of the main receiver.

* * * * *